(12) United States Patent
Eneroth et al.

(10) Patent No.: US 6,631,116 B1
(45) Date of Patent: Oct. 7, 2003

(54) METHOD OF INDICATING MINI CELL SIZE

(75) Inventors: Lars Göran Vilhelm Eneroth, Tyresö (SE); Karl Anders Näsman, Solna (SE); Lars-Göran Petersen, Tuma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/789,479

(22) Filed: Jan. 27, 1997

(30) Foreign Application Priority Data

Jan. 25, 1996 (SE) .............................................. 9600279

(51) Int. Cl.⁷ .............................................. H04L 12/26
(52) U.S. Cl. ................................ 370/236.2; 370/236.1; 370/395.61; 370/324; 370/522; 370/474; 455/515
(58) Field of Search ................................ 370/471, 416, 370/349, 473, 470, 252, 468, 472, 395, 324, 396, 398, 465, 395.61; 371/53; 455/515

(56) References Cited

U.S. PATENT DOCUMENTS

| | | | | |
|---|---|---|---|---|
| 4,691,314 A | * | 9/1987 | Bergins ...................... | 370/471 |
| 5,097,466 A | | 3/1992 | Kammerl | |
| 5,287,348 A | | 2/1994 | Schmidt et al. | |
| 5,541,919 A | * | 7/1996 | Yong .......................... | 370/416 |
| 5,550,802 A | * | 8/1996 | Worsley ..................... | 370/252 |
| 5,675,591 A | * | 10/1997 | Salzwedel ................... | 371/53 |

FOREIGN PATENT DOCUMENTS

WO     WO 95/34977 A1     12/1995
WO     WO 96/34478 A1     10/1996

OTHER PUBLICATIONS

G. Eneroth et al., "Minicell Protocol (AALm) for Low Bit Rate Applications" ATM–Forum 96/0166, Feb., 1996.
T. Ishihara, "Proposal of Short Cell Format for Low Bit Rate Voice", ATM–Forum/95–1478, Dec. 1995.
M. J. McTiffin, et al., "Mobile Access to an ATM Network Using a CDMA Air Interference", 8272 IEEE Journal on Selected Areas in Communications, 12(1994) Jun., No. 5, pp. 900–908, New York, US.
Maximilian A. Ott, et al., "Prototype ATM LAN System Multimedia on Demand Applications", 298 NEC Research & Development, 35(1994) Oct., No. 4, pp. 366–373, Tokyo, JP.
"B–ISDN ATM Adaptation Layer (AAL) Type 5 Specification", ITU–T Recommendation 1.363.5, 1996.
"An AAL for Transporting Short Multiplexed Packets (SMAAL)", T1S1.5/95–001 Revision 1, Dec. 1995.

* cited by examiner

*Primary Examiner*—Seema S. Rao
*Assistant Examiner*—Alexander O. Boakye

(57) ABSTRACT

The invention relates to a method of changing the size of mini cells belonging to an individual connection during an ongoing connection. A control mini cell is used for this purpose. The control mini cell is transported either in a separate connection or in the same individual connection the mini cell size of which it shall change. Depending on system design the control mini cell is handled either at the control plane by the operation and maintenance system of the telecommunication network or is it handled at the traffic plane by transmission equipments.

19 Claims, 19 Drawing Sheets

| CODE | SEIZE (OCTETS) |
|---|---|
| 0 0 0 | 4 |
| 0 0 1 | 8 |
| 0 1 0 | 16 |
| 0 1 1 | 20 |
| 1 0 0 | 35 |
| 1 0 1 | 43 |
| 1 1 0 | 56 |
| 1 1 1 | 60 |

12

11A 11B
E (E)
11 13 14 14A

| CODE | SEIZE (OCTETS) |
|---|---|
| 0 0 0 0 0 0 | 2 |
| 0 0 0 0 0 1 | 4 |
| 0 0 0 0 1 0 | 5 |
| 1 1 1 1 0 0 | 100 |
| 1 1 1 1 0 1 | 125 |
| 1 1 1 1 1 0 | 150 |
| 1 1 1 1 1 1 | 200 |

15

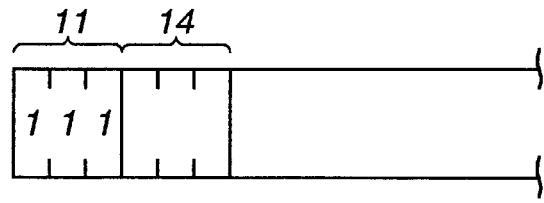
Fig.8
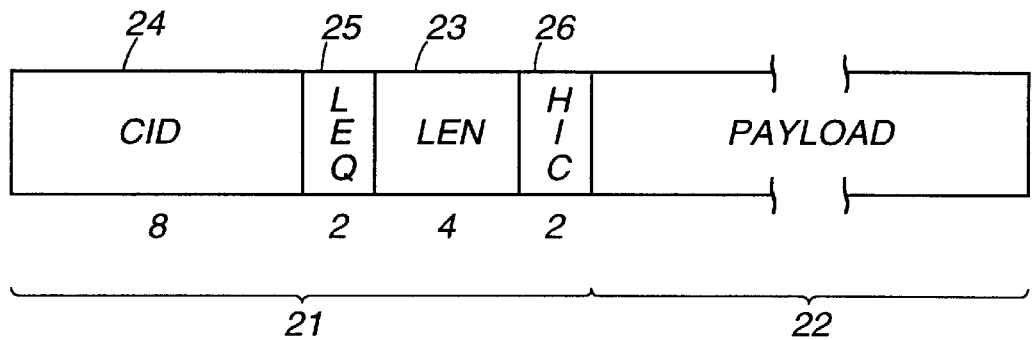
Fig.9
Fig.10

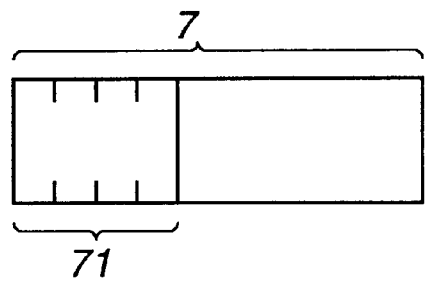
Fig.20
Fig.21
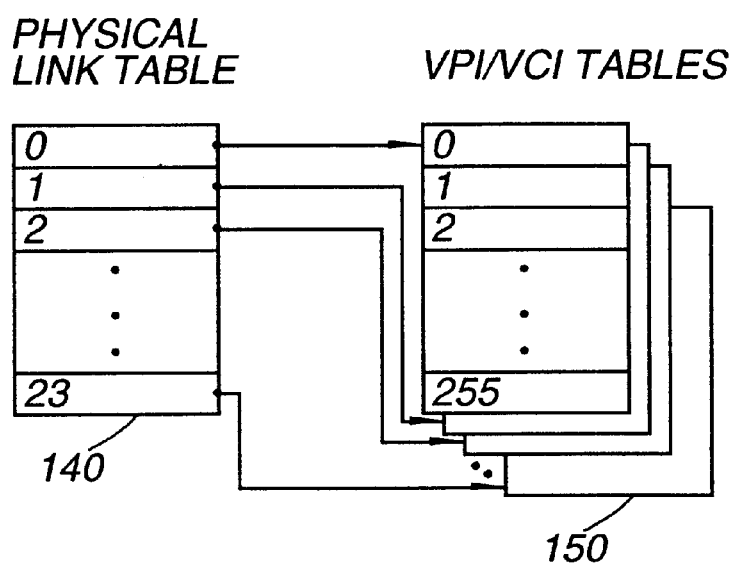
Fig.22

METHOD OF INDICATING MINI CELL SIZE

TECHNICAL FIELD OF THE INVENTION

This invention relates to telecommunication networks in general and to the transport network of a mobile telephone network. ATM cells are used for transmission of data. The payload of an ATM cell comprises mini cells.

DESCRIPTION OF RELATED ART

To day the size of mini cells to be used for an individual connection is explicit indicated in each one of the mini cells of said individual connection. Typically 6 to 10 bits are used for size indication. The size information is of static nature, i.e. it does not change, as long as the mini cells don't change size.

It is sometimes necessary to modify the size of a mini cell during an established connection. For example, the speech rate should be changed from full to half, or should the service be changed from speech to data or should a variable rate speech codec be used or should congestion of the traffic between two nodes be reduced by making the mini cells of all connections between said nodes smaller.

The explicit method of indicating mini cell size means that the bits used for size indication are overhead costs as regards the efficiency with which available band width is used as well as regards the efficiency with which mini cell size is indicated.

SUMMARY

A main object of the invention is to provide a method for inicating the size of mini cells pertaining to an individual connection only when needed. In accordance with the invention indication of the mini cell size is needed only at instants when-the mini cell size is changed. At such instants the new mini cell size to be used for the following mini cells of the connection are indicated.

Another object of the invention is to provide a method of dynamically changing the size of a mini cell during an ongoing connection.

Another object of the invention is to provide a method for changing the size of a mini cell belonging to an individual connection with the aid of a mini cell. A mini cell used for this purpose is called a control mini cell.

Another object of the invention is to provide a method by which the control mini cell is sent in a control channel different from the channel in which mini cells containing user data are transported.

Still another object of the invention is to provide a method by which the control mini cell is transported in the same channel as that in which mini cells containing user data are transported.

A further object of the invention is to provide a synchronization mechanism for effecting change of mini cell size of an individual, ongoing connection. In particular the synchronization mechanism is intended to be used when the control mini cells are transported in a channel which is different from the channel in which mini cells containing user data mini cells are In a mobile telephone system that uses ATM cells in the transport network reduced bandwidth or enhanced use of the available bandwidth will make it possible to add more channels into the system.

A large number of connections, which require a larger CID field, will increase the bandwidth gain if statistical multiplexing is used.

BRIEF DESCRIPTION OF THE DRAWINGS

The invention will be better understood and other characteristics thereof will emerge from the following description made with reference to the appended Figures wherein:

FIG. 8 shows a fixed size length field and an extended fixed size length field created with the extension code method, FIG. 9 shows the basic format of a mini cell the header of which is provided with a short fixed length field and a length extension qualifier field LEQ comprising different extension codes, FIG. 10 is a table, FIG. 20 shows a mini cell's header wherein the circuit identifier CID is used to indirectly indicate the mini cell size, FIG. 21 is a mapping table used together with the indirect method for indicating the cell size, FIG. 22 shows different tables which together span up an address space used on the links of the transport network in a mobile telephone system.

DETAILED DESCRIPTION OF EMBODIMENTS

Figure 1:
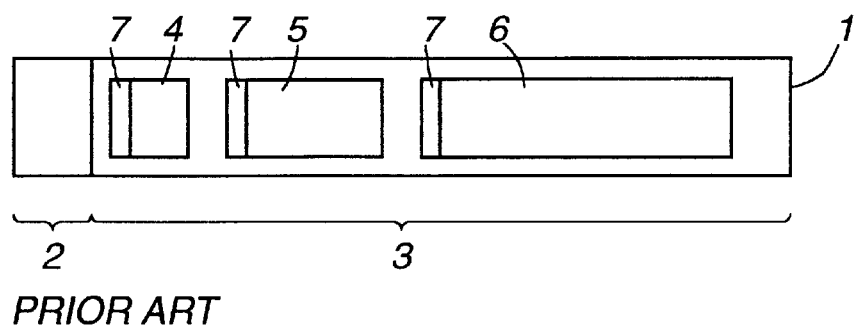
FIG. 1 shows the format of an ATM cell transporting mini cells therein.

In FIG. 1 an ATM cell 1 is shown which comprises a header 2 and a payload 3. Conventionally the payload comprises user data relating to an individual connection. In the aforesaid PCT/SE95/00575 patent document an ATM cell is disclosed which in its payload carries one or more mini cells. In the example shown in FIG. 1 three mini cells 4, 5 and 6 of different sizes are shown. The ATM header 2 comprises 5 octets (1 octet=8 bits=1 byte) and its payload 3 comprises 48 octets. Each mini cell 4, 5, 6 comprises a header 7 and user data.

Figure 2:
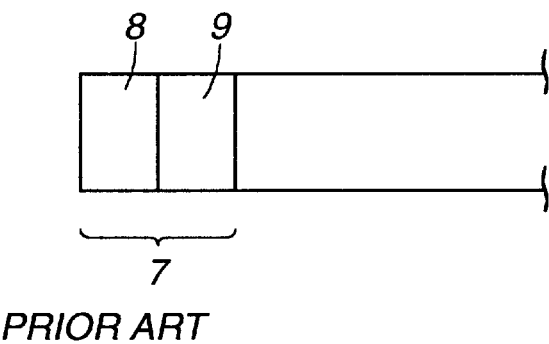
FIG. 2 shows the header of a mini cell transported in the ATM cell in FIG. 1.

In FIG. 2 an example of a mini cell header 7 is shown to comprise 2 octets 8, 9. Other mini cell header sizes are also conceivable depending on the ATM system design. A mini cell header size of 3 octets or more are also conceivable. The mini cell header 7 comprises a circuit identifier CID, which identifies the established connection/circuit, a payload type selector PTS which identifies different payload types such as user data, control data, maintenance data, a length indicator LEN, and a header integrity check field/bit HIC, which supervises the header integrity. The length indicator LEN defines the size of the payload of the individual mini cell.

There is a need for distinguishing between different types of mini cells. The following is required to indicate with the PTS field:

User information of fixed length: The length indicator LEN is not necessary in the header and the user information length is instead configured into the system and into the service. For "GSM full rate", the user information length is 35 octets, for PDC full rate it is 20 octets and for "D-AMPS full rate" it is 23 octets.

User information of different sizes, i.e. user information with variable length: This is the preferred embodiment and will be described below. To use the PTS field in order to indicate user information with variable length is a future proof solution.

User information of different sizes of extended lengths. OAM information per circuit/connection.

Synchronization information: The use of the PTS field for this purpose is optional.

Figure 3:
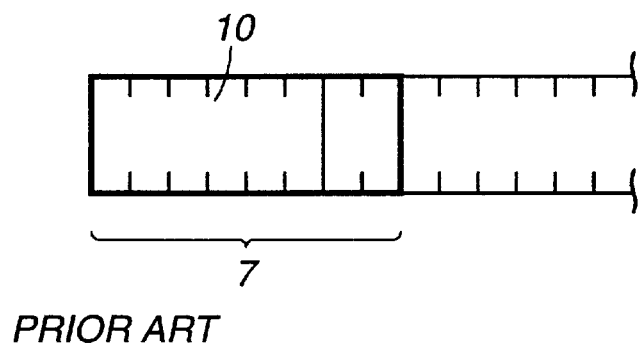
FIG. 3 shows an octet of the cell header of FIG. 2, said octet comprising a fixed size length field for cating the length of the mini cell.

In FIG. 3 the cell header 7 is shown to comprise a fixed size length field 10, referred to as LEN field, which is used to indicate the size of the user data of the mini cell to which the header belongs. The size of the mini cell is indicated in this field 10 using linear coding. Linear coding means that the code corresponds to the actual size of the mini cell. For example, if the cell length is 5 octets a binary 5 (000101) is written into the LEN field. For short mini cell sizes the fixed length field 10 will occupy much band width but all of the occupied band width is not used for transmission of useful information as exemplified by the leading zeros in the two examples given. It should be noted that the LEN field 10 is carried by each mini cell of an individual connection. A further drawback with this fixed size LEN field 10 is that the range of cell sizes which can be expressed with linear coding is restricted. With a fixed size LEN field 10 comprising 6 bits cell sizes from 1 to 64 octets can be indicated. Should larger cell sizes be used for an individual connection, then the length of the fixed size length field 10 must be enlarged which in turn leads to even more waste of band width.

Figure 4:
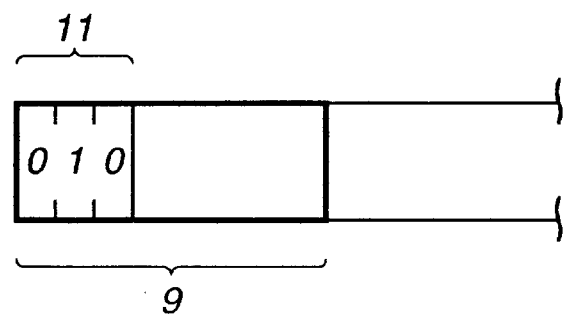
FIG. 4 shows an octet in the header of a mini cell, said octet comprising a linearly coded fixed size length field.

In FIG. 4 a fixed size length field 11 is shown. Non-linear coding is used to indicate a wide range of different cell sizes. In the example given 3 bits are used in an octet, for example octet 9, of a mini cell's header. The rest of the bits of the same octet are free and can be used for any of the above listed purposes. This contributes to reduce the overall size of the header which in its turn increases the efficiency with which the band width is used.

In a mobile telephony system mini cells are generated by voice coders. Today the current IS 95 voice coders uses 2, 5, 10 or 22 octets. Using the fixed size length field 10 in accordance with said ANSI document 7 bits would be required in the header of the mini cell in order to indicate a cell size of 22 octets. With the non-linear coding in accordance with FIG. 4 the fixed size length field 11 is 3 bits. This gives a band width saving of 10% for an IS 95 voice coder that operates at 2 kbps (5 octets per 20 ms).

Figures 5, 6, 7:
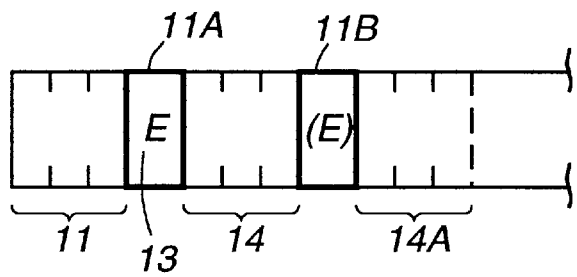
FIG. 5 is a mapping table.
FIG. 6 shows the fixed size length field and an extended fixed size length field created by the extension bit method.
FIG. 7 is a mapping table.

In FIG. 5 a mapping table 12 is shown which is to be used together with a fixed size length field 11. As appears from the table the code values do not correspond to the mini cells sizes but instead predefined cell sizes are allocated to a respective code value only three code bits are used. Examples of mini cells sizes are given in the size column of the mapping list. The sizes vary from 4 to 60 octets. Of course the range can be increased, but the maximum number of sizes is given by the number of code bits used.

To expand the number of sizes that can be used together with the non-linear coding it is possible to extend the fixed LEN field 11 on demand. Two methods will be described. Either an extension bit in the fixed size LEN field 11 is used as a qualifier for extension of the LEN field 11 and the method is referred to as the extension bit method, or is one of the length field codes used as qualifier for extension of the LEN field 11 in which case the method is referred to as the extension code method.

In FIG. 6 a bit 13, also labeled E, following the LEN field 11 is reserved as an extension bit 13. When the extension bit 13 is set to 1 this will indicate that the header of the mini cell comprises an extended LEN field 14 of the same size as the fixed size LEN field. When the extension bit is zero, the cell header comprises the fixed LEN field 11 only.

The extended length field 14 comprises 3 bits in the illustrated example.

When the extension bit 13 is set the number of bits available for the mapping table 12 will increase from 3 to 6 bits leaving a mapping table 15 shown in FIG. 7. Since the extension bit 13 is reserved for this purpose it cannot be used for code size mapping purposes.

A variation of the extension bit method is to append an extension bit 11B to the extended LEN field 14. The appended extension field is used to indicate if there is a further extended LEN field in the header in the mini cell or not. If the appended extension bit 11B is set to 1 this indicates that a second extended length field 14A should be added to the header, thus increasing the number of code bits in table 15 from 6 to 9. If the appended extension field comprises a bit which is set to 0 no such second field is used.

In FIG. 8 the extension code method is illustrated. In accordance with this method a code in the fixed length field 11 of FIG. 4 is reserved and is used as extension code. Suppose, as an example, that binary code 111 in mapping table 12 is used as an extension code. When this code 111 is present in the fixed length field 11 it means that an extended length field 14 should be included in the header of the mini cell. Thus another 3 bits are available for size mapping. This has been illustrated in FIG. 8. This method will reduce the number of sizes in mapping table 12 with 1 and will add another seven cell sizes that can be mapped on the additional 8 code values of the extended length field 14.

From band width efficiency view the extension code method is better than the extension bit method since it requires 3 bits, while the extension bit method requires 4 bits. Looking on the value range the extension bit method is better than the extension code method since it provides 16 different cell sizes compared to 14 as provided by the extension code method.

In FIG. 9 the extension bit method has been combined with the extension code method in a manner that allows for high efficiency use of the bits available in a cell header while at the same time a broad range of cell sizes are covered and the band width is used efficiently.

The basic format of the mini cell using this combined coding method is shown in FIG. 9. The mini cell comprises a header 21 of 2 octets and a payload part 22 which may comprise from 1 to 48 octets. The four least significant bits of the length of the mini cell is indicated in a small fixed size length field 23, LEN field, in the header. The LEN field 23 comprises 4 bits. The header also comprises a CID field 24 which occupies 8 bits and which identifies the circuit to which the mini cell belongs. Also in the header there is a length extension qualifier field 25, LEQ field, and a header integrity field 26, HIC field, both 2 bits long.

The length extension qualifier LEQ 25 is defined as a length extension for the payload and as a header extension.

When LEQ takes the binary codes of 00, 01 and 10 the mini cell has the basic format shown in FIG. 9 and the code bits of LEQ constitute bits to be appended to the LEN field 23. In this case the LEQ field will thus serve as an extension of the LEN field 23.

In particular, $2^4$ different values in LEN field 23 is associated to the binary 00 code existing in the LEQ field 25, $2^4$ different values in LEN field 23 is associated with the binary 01 code existing in LEQ field 25 and $2^4$ different values in LEN 23 is associated with the binary code 10 existing in LEQ field 25. This is illustrated in FIG. 10. This gives a total of 48 different length values in accordance with the following general expression:

$$[2^{length\ of\ LEQ\ in\ bits} - m] \times [2^{length\ of\ LEN\ in\ bits}],$$

where m is the number of codes used to indicate the extended format of the mini cell.

Accordingly the payload size can be chosen from forty-eight length values. In the example given the length values are coded as 1 to 48.

Figure 11:
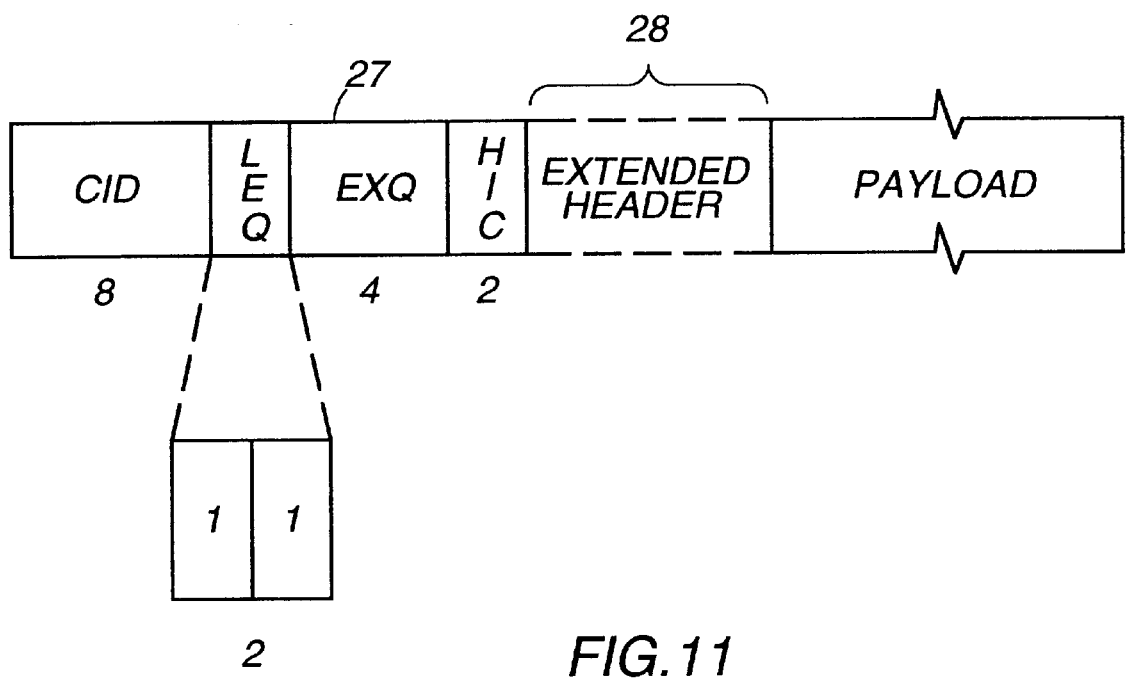
FIG. 11 shows the extended format of a mini cell.
Figure 12:
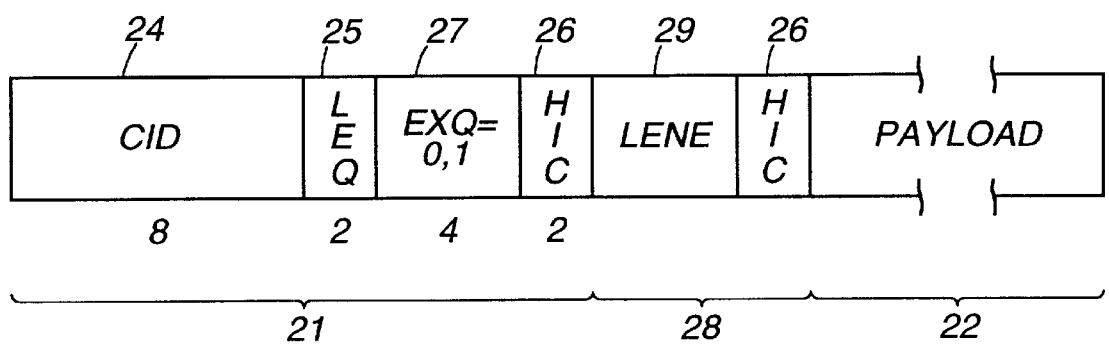
FIG. 12 shows the mini cell of FIG. 9 in its extended format when predefined extension codes are present in the length extension qualifier field.

When the LEQ field 25 takes the binary code 11 this signifies that the basic cell format should be extended. The extended format is shown in FIG. 11. The LEQ field 25 has a double meaning. The double meaning of LEQ is (i) it is used as the two most significant bits of length indication, i.e. LEQ x $2^4$+LEN as shown in FIG. 9 and (ii) it is used as indication of extended header format as shown in FIGS. 11 and 12, i.e. the LEN field 23 is interpreted as an extension qualifier field 27, EXQ field 27. The EXQ field 27 comprises 4 bits.

Figure 13:
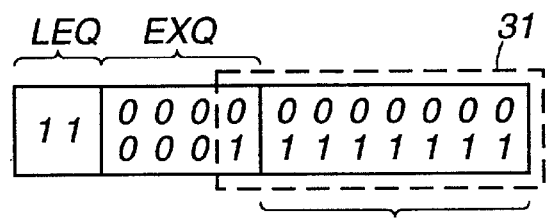
FIG. 13 is a table.

Of the four bits of the EXQ field 27 the binary values of 0000 and 0001 are reserved for use together with a further length field 29, LENE field, in the manner shown in FIGS. 12 and 13. In particular the least significant bit in EXQ field 27, should be appended to the seven bits in the further LENE field 29 in a manner shown in the dashed rectangle 31 in FIG. 13. This is similar to what shown in FIG. 10. For the EXQ binary value of 0 this will give 128 different length values and for the EXQ binary value of 1 this will give another 128 different length values.

The number of different length values that can be used with this method is given by the following general expression:

$$[2^{number\ of\ EXQ\ bits\ used}] \times [2^{number\ of\ bits\ in\ LEN\ 29}]$$

In a preferred embodiment of the invention an EXQ value of 0 is used to indicate mini cell lengths varying from 1 to 128 octets and an EXQ value of 1 is used to indicate mini cell lengths varying from 129 to 256 octets.

It should be noted that the length of the mini cell shown in FIGS. 9 and 12 is indicated by using a linear coding.

Figure 14:
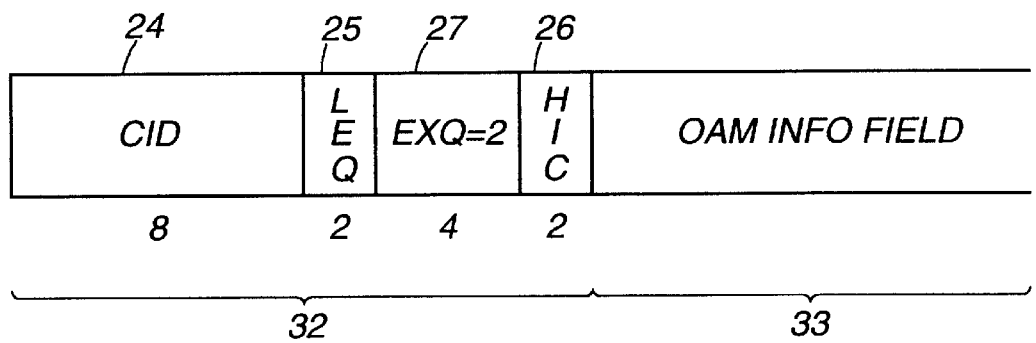
FIG. 14 shows an operation and maintenance cell.

An EXQ value of 2 (binary 0010) is used to signify that the mini cell is an operation and maintenance cell, OAM cell, that comprises a header 32, and an OAM information field 33 as shown in FIG. 14. The header 32 is similar to the header 21 in FIG. 12. In the LEQ field 25 the binary code 11 is present and in the EXQ field 27 the binary code 0010 is present.

The EXQ code 3 (binary 0011) is used to indicate a fixed length mini cell, for example for the DAMPS system standard. Other EXQ values can be used for other systems standards or services.

EXQ code values 1xxx are used as synchronization cells; wherein xxx is timing information.

In the preferred embodiment a main requirement is that the header of the mini cell at the maximum has a length of 2 octets. Given this restriction the available bits are used in an efficient way to cover all ranges of values.

In FIGS. 9, 11, 12, 14 preferred sizes are indicated under the respective fields. The indicated sizes are just examples and many other sizes of the different fields can be used. Other LEQ and EXQ codes than the indicated can be used as bits that are appended to the LEN field 23 and LENE field 29.

Figure 15:
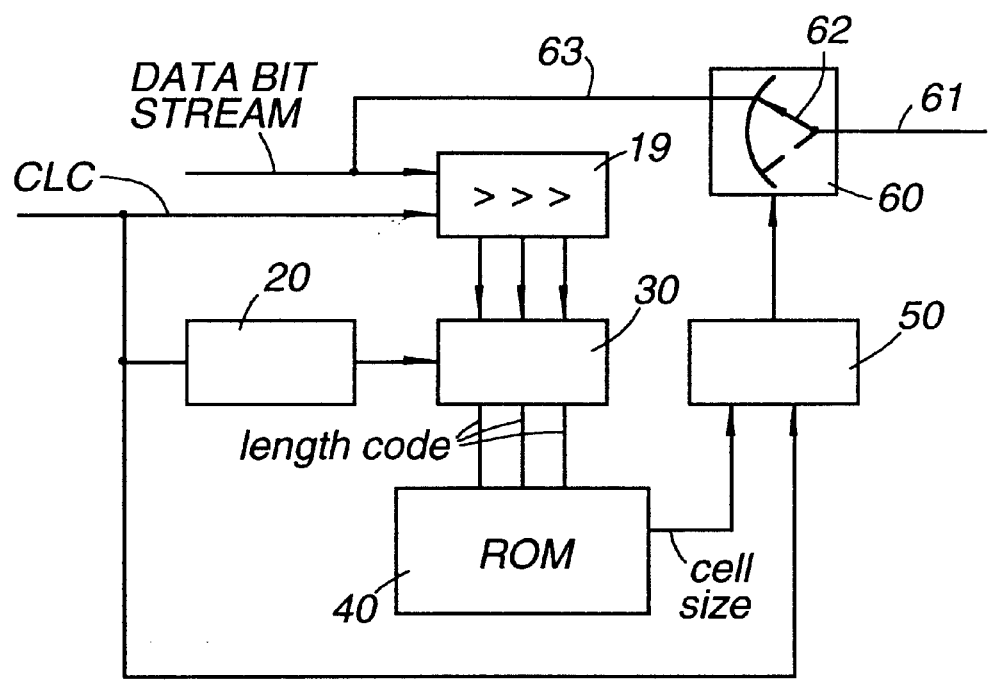
FIG. 15 is a block diagram showing a mini cell header analyzing unit used to extract, from the user data channel, the user data part of a mini cell in which the fixed size length field carries the non-linear coding.

In FIG. 15 a block schema of a cell header reading device is shown. It comprises a shift register 19, a first counter 20, a latch register 30, a ROM memory 40, a second counter 50 and a multiplexor 60. A bit stream comprising the user data of the mini cells is shifted into shift register 19 at one input thereof. A clock signal controls the frequency at which the data bits are shifted into the shift register 19. The clock signals are counted by the first counter 20 which is used to extract the fixed size length field 11 of a mini cell and write its data into the register 30. The fixed length field or rather the information therein is used as address to the ROM memory 40 which has been configured with the mapping table shown in FIG. 5. Accordingly, an individual code, in the following referred to as length code, will correspond to a specific length of the user data. From the ROM memory 40 the size of the user data (mini cell size minus the size of the header) is read and is sent to the second counter 50 which controls the multiplexor 60 such that at the output 61 thereof the user data will appear. Suppose the first counter 20 reads the binary code 011 from the user data channel. This code is used as address to the ROM memory and at this address the cell size 20 is stored. Accordingly the length of the user data should be 20 octets. Next the second counter 50 counts the following 20 octets bit by bit by counting a corresponding number of clock pulses. The multiplexor 60 is shown to have an arm 62 which is movable between the indicated two positions. Initially counter 50 sets the arm 62 to the lower position shown with dashed lines and no output data will appear at output 61. When the second counter 50 receives the cell size from the ROM memory 40 it moves arm 62 into the upper position. In the upper position arm 62 connects to a line 63 which in its turn is connected to the input user data channel. When the second counter 50 has counted 20 octets it moves arm 62 back to its initial position and the correct number of octets has now been produced at output 61.

Figure 16:
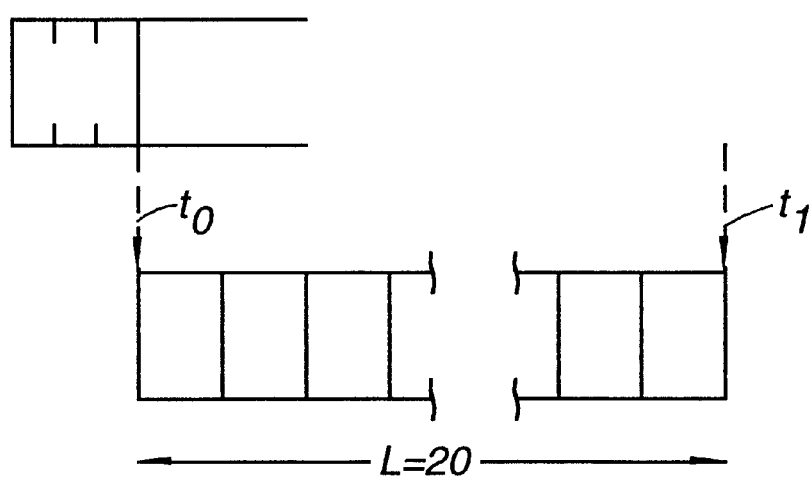
FIG. 16 shows a mini cell's header and user data as extracted from the user data channel.

In FIG. 16 the extraction of the fixed size length field 11 from the user data channel at time t is indicated. At time t counter 20 starts to count 20 octets bit by bit and at time $t_1$ counter 20 has counted 20 octets. Accordingly arm 62 will be in the upper position in FIG. 15 between times t and $t_1$.

In the cell header reading device shown in FIG. 15 a predefined number of length codes and cell sizes are stored in ROM 40. In the cell header reading device shown in FIG. 17 a RAM memory 70 is used to which length codes and cell sizes are written from a control system 80. In this manner it is possible to configure different specific mini cell sizes for individual mobile telephone systems.

The mini cell sizes stored in ROM 40 are global in the sense that an individual length code, for example 101, relate to all connections which use mini cells with this length code.

It is, however possible to have a specific mini cell size for a specific connection or for a specific physical link by using the control system 80 and the RAM memory 70 as will be described in connection with FIGS. 18–27.

Figure 17:
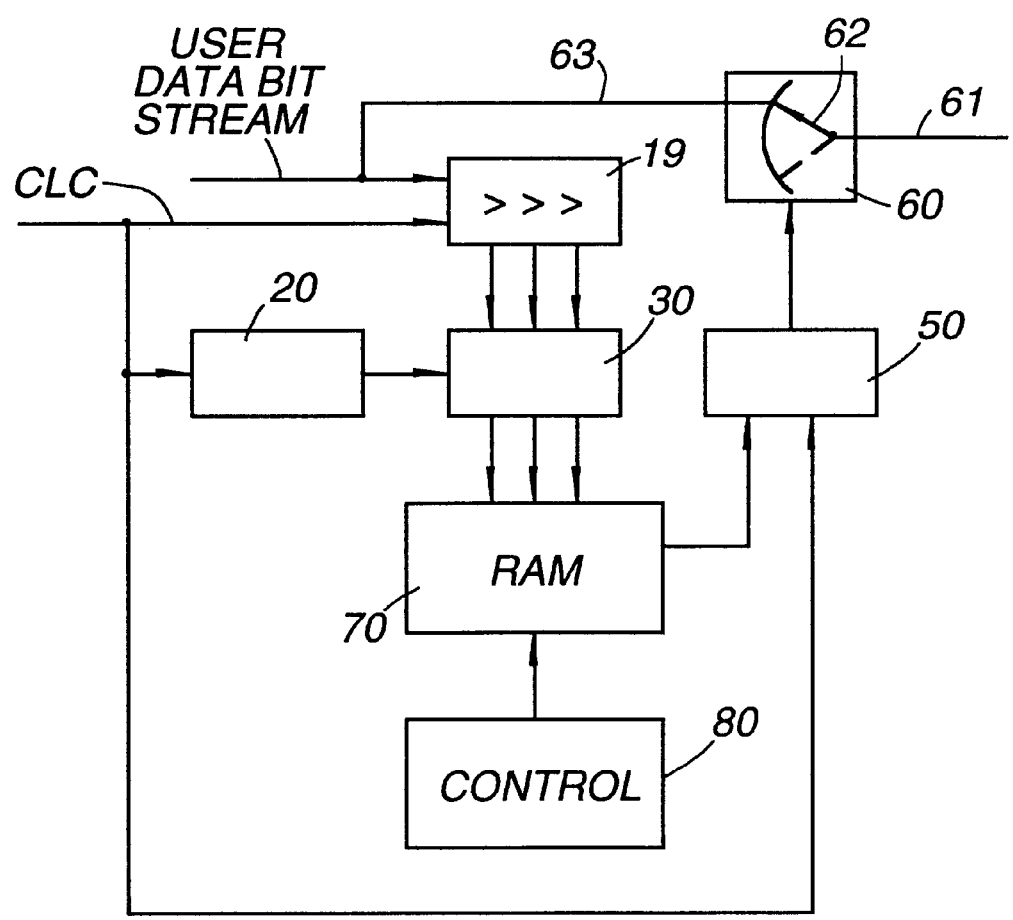
FIG. 17 is a block diagram of a mini cell header analyzing unit used to extract the user data part of a mini cell from a user data channel using the extension code method.
Figure 18:
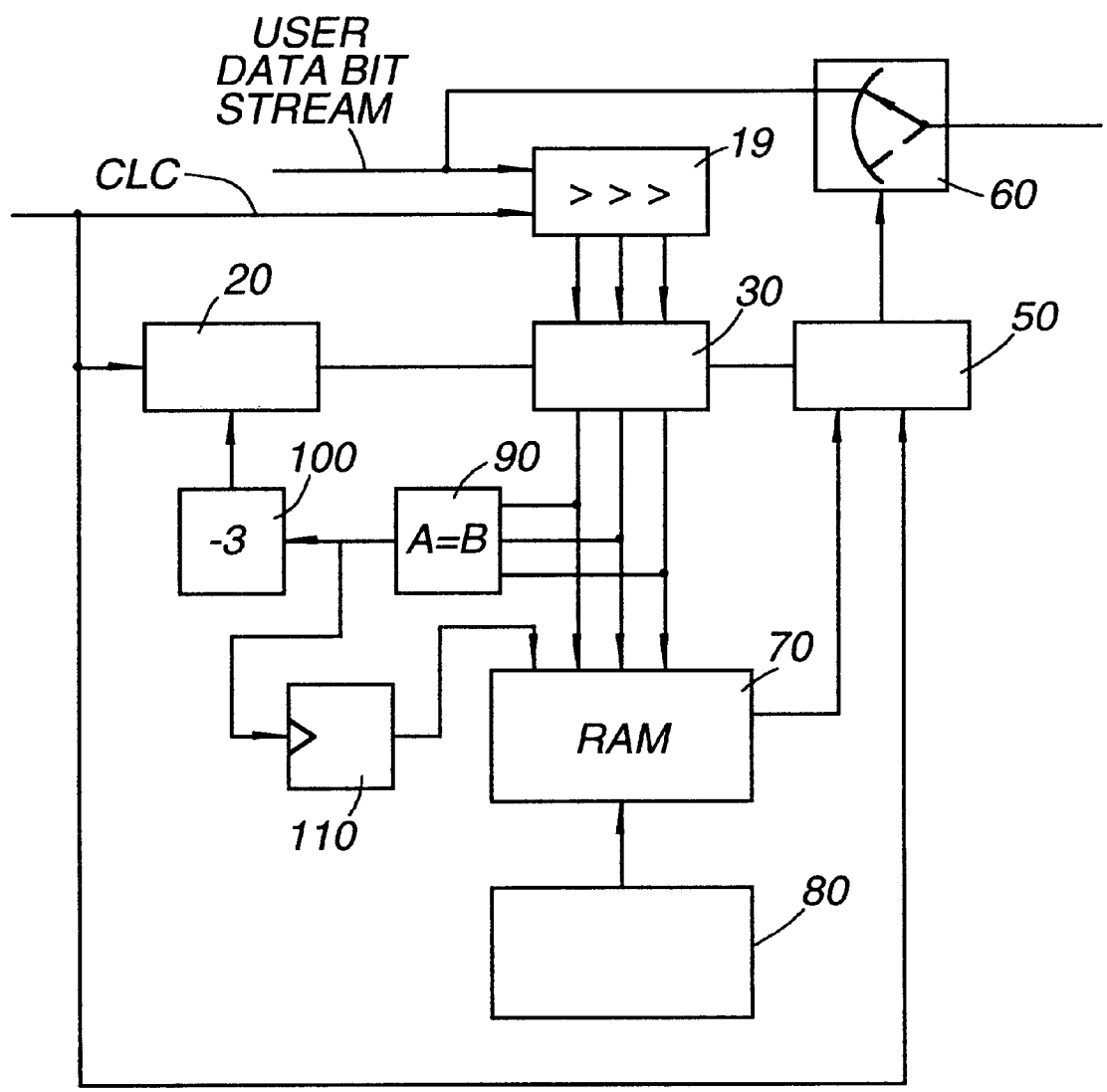
FIG. 18 is a block diagram of a modified mini cell header analyzing unit used to extract the user data part of a mini cell from a user data channel using either the extension code method or the extension bit method.

FIG. 18 is a block diagram of a cell header reading device used for implementing the extension code method. In FIG. 18 blocks with the same functions as corresponding blocks in FIGS. 15 and 17 have the same reference designations. The circuit differs from that shown in FIGS. 15 and 17 in that there is a comparator 90 which is used to detect the extension code. If there is a match, the comparator triggers a subtractor 100 which counts down the first counter 20 by 3 counts. When this has been done the extended length field, or specifically the data therein, is again written into the register 30. The various sizes associated with the extended field 14 must be added to the RAM memory 70. This implies that the number of cell sizes in the RAM memory will be doubled. In practice this means that a new memory bank will be used in the RAM memory 70. Unit 110 is a D-latch which latches the output value of the comparator 90 and uses it to address the new memory bank, in the RAM memory 70.

The comparator 90 and the subtractor 100 are the units that will handle the extended length field 14 so that the position in the header will be moved when the extension code is detected. Three extra bits will be added to the length field 11 and it is these extra bits that will be used to indicate the cell length. Accordingly the fixed size length field 11 is replaced with the extended length field 14 which is inserted into the data stream.

Compared with the operation of the circuit in FIG. 15 or 17 where a field is written into the memory, in FIG. 18 another field is written into the memory 70.

Figure 19:
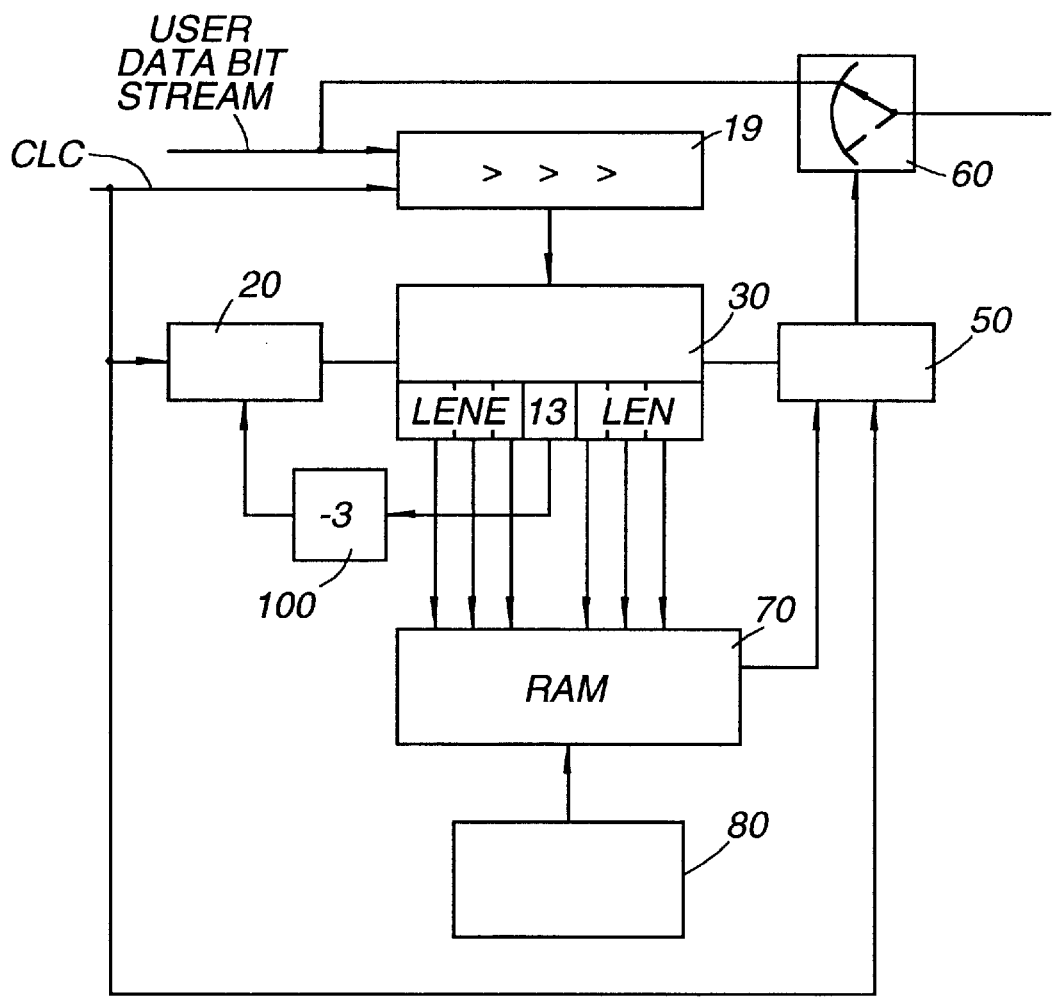
FIG. 19 is a block diagram showing a mini cell header analyzing unit used to extract the user data part of a mini cell from a user data channel using the bit extension method.

The cell header reading device shown in FIG. 18 can also be used in order to implement the extension bit method. This is indicated in FIG. 19. From the register 30 that contains the fixed size length field 11 the extension bit 13 is extracted and is used to increase the address range. The extension bit will count down the first counter 20 with three bits, indicated by the subtractor 100. This implies that three new bits will be written into register 30 and these new three bits plus the old three bits, i.e. altogether six bits, are used to address the RAM memory 70 as symbolized by the six arrows. In this manner the number of cell sizes has been increased.

The ROM memory 40 may have several different mapping tables of the kind shown in FIG. 5. It is possible to change from one mapping table to another in response to a predefined length code provided in the header of a mini cell. In this mammer it will be possible to switch from a first set of mini cell lengths, for example 4, 8, 16, 20 to a second set of lengths, for example 3, 6, 9, 12. Instead of using a ROM memory 40 configured with the mapping table shown in FIG. 5 a RAM memory can be used for the same purpose. This will enable the control system 80 to write in new a new set of mini cell lengths in the RAM memory. The whole table can also be transferred in the control message.

Instead of providing each cell with a fixed size length field which is used to indicate the mini cell size it is possible to use an implicit method of indicating the mini cell size which does not use any length field in the mini cell header. According to the implicit method of indicating mini cell sizes, information relating to the sizes is resident within the system network. Instead of using a dedicated field to indicate the cell size an existing field in the mini cell header is used. In the preferred embodiment of the invention mini cell sizes are mapped on the identities of established connections. Accordingly sizes are not global but connection oriented.

The identity of a connection is given by the CID field of a connection. In FIG. 20 the mini cell header 7 is shown to comprise a CID field 71. The actual size of the CID field 71 depends on the system but generally two octets should be sufficient. By using the same mapping method as described in connection with FIGS. 6 and 7 a mapping table 72 results.

Accordingly the fixed length field 11 has been discarded. This will increase the band width efficiency. The CID value is used as address to the RAM memory 70 in FIG. 17 and is provided by the control system 80. So, instead of latching the length field 11 in the register 30, the CID value is latched in register 30 and is used as address to the RAM memory 70.

In this manner there will be a relation between the identity of the established connection and the length of the mini cells used in the connection. Accordingly no additional memory places are needed for storing the relation between a CID and a size of the mini cell associated with said CID.

At set up of a connection the control system 80 will receive a message which requests (a) that a connection should be set up between to identified end points and (b) that this connection shall use mini cells having a size of X octets. X is supposed to be an integer selected among the available cell sizes. Next the control circuit selects a free CID among logical addresses provided by the ATM network. For the sake of the example CID=7 is selected. The control system 80 will now use 7 as an address to the RAM memory 70 and will write at this address the mini cell size X. The cell header reading device shown in FIG. 17 will then operate in the same manner as described. It should be noted that the mapping takes place at connection set-up.

It should be noted that one and the same CID may relate to several different mini cell sizes depending on the fact that cells having the same CID can be transported on different virtual connections VC:s. This is illustrated in FIG. 22 wherein a typical address structure used in an ATM network is shown. To each physical link, referred to as physical route, in the ATM network, there is a physical link table 140 having a number of entries, for example the indicated entries 0–23. To each physical link is associated a respective VPI/VCI (virtual path/virtual identifier) table 150. As an example there are 256 virtual paths VP 0–255 in each physical link. In each VC connection, identified with an VCI–/VPI value, there is as an example 256 mini cell connections each having its individual CID.

Certain applications require that the mini cell size is changed on a millisecond basis. Other size change methods fulfilling this requirement use cell size change mini cells transported in the user data channel. This will be described in connection with FIGS. 24–27. The size change methods used require no processing by the control system 80 and require no synchronization mechanism.

Figure 24:
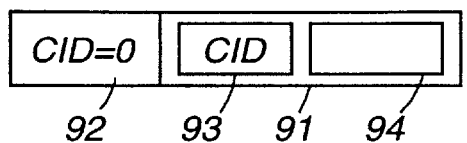
FIG. 24 shows a system global specific mini cell used for changing the size of mini cells belonging to an individual connection.
Figure 25:
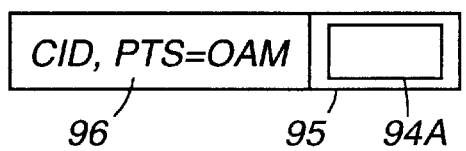
FIG. 25 shows an OAM mini cell used for changing the size of mini cells belonging to the connection to which the OAM cell is related.
Figure 26:
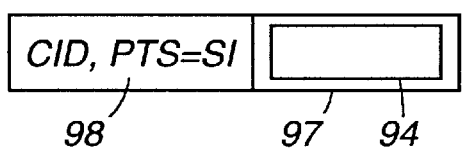
FIG. 26 shows a specific mini cell used for changing the size of mini cells of a connection, said specific mini cell belonging to the connection the mini cells of which are to be modified.

In particular a specific mini cell is used to indicate the new size in accordance with the methods described in connection with FIGS. 24–27. The new mini cell size is given in the payload 94. Four different types are used:

1) a specific EXQ-value defines a size indicator mini cell, as shown in FIG. 26,
2) a defined EXQ-value of 2, that is an OAM cell, is used as shown in FIG. 25,
3) the size change indicating mini cell is indicated by a specific CID-value, for example CID=0, and the connection is identified by the CID field 93 in the payload, as shown in FIG. 24,
4) the type described in the fifth method below.

The new mini cell size to be used for the following mini cells in a connection is indicated in the length field 94. All mini cells following the mini cells 91, 95, 97 in the data stream and having the same CID will have the new cell size and will have their size indicator set to zero thus indicating that the mini cell is used for user data.

Depending on the implementation of the telecommunication system the mini cell that comprises information indicative of mini cell size change is, or is not, in sequence with, i.e. linked with, the first mini cell that has the new length in the user data stream. This may or may not give rise to a synchronization problem. A mini cell comprising mini cell size change information will in the following be referred to a control mini cell. It should be noted that a control mini cell may comprise, further to mini cell size change information, other information such as user data, control data, OAM data etc.

Five methods for changing the size of a mini cell of an on-going, that is a connection in operation, will be described.

Method 1.—General Overview

Figure 23:
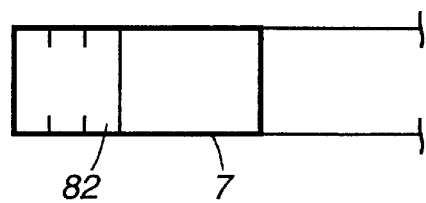
FIG. 23 shows a mini cell's header provided with a synchronization bit used for synchronization of a message that orders change of the size of a mini cell.

If the mini cell size should be changed not to frequently, i.e. less frequent than each second, it is proposed in accordance with the present invention to change the size with a control message which is sent over the access protocol between a base station and a controlling node such as for example a mobile switching center MSC. The controlling node will be handling and controlling all equipment involved in the establishment of the mini cell connection, in particular the control system 80 in FIGS. 17, 18 and 19. The control message is sent over a channel which is different from that in which mini cells are transported. There will thus be necessary to provide synchronization between the sending end of the mini cells and the receiving end of the same mini cells. In accordance with the invention such synchronization is provided by setting a flag in a bit of the header of a mini cell as indicated in FIG. 23 wherein the flag bit is labeled 82.

Figure 29:
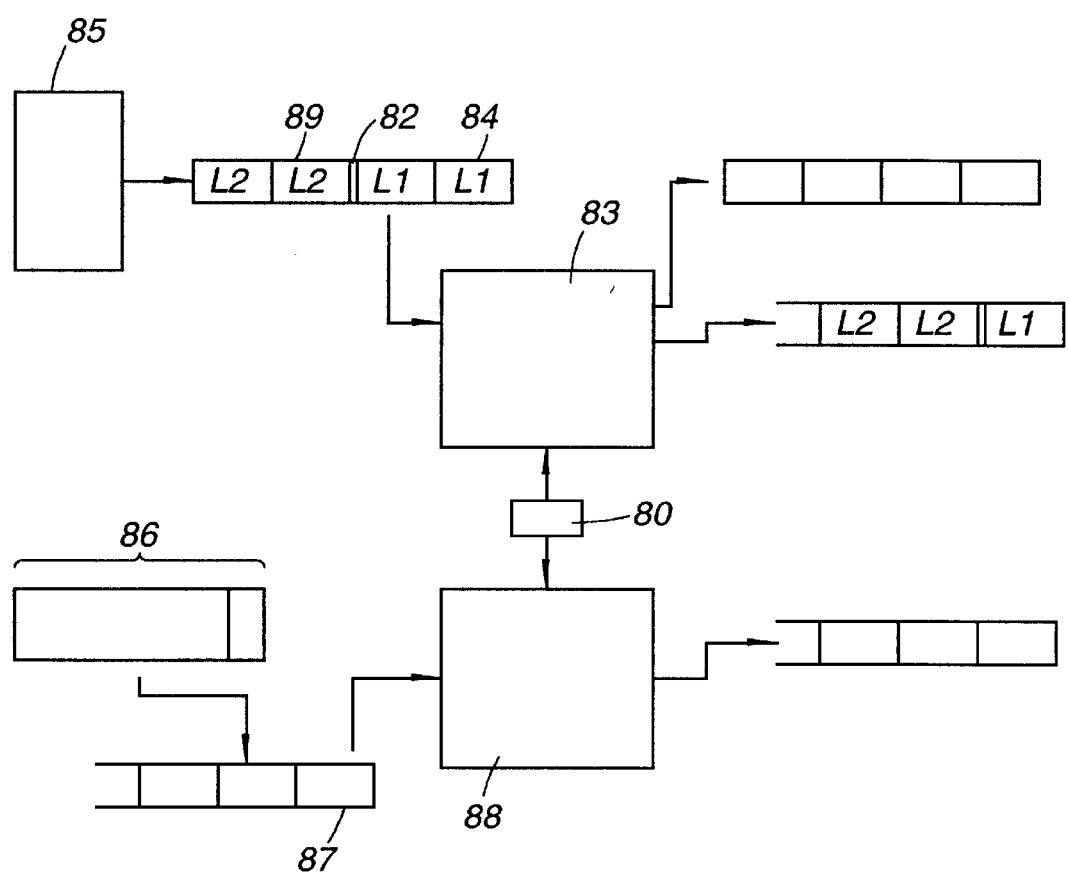
FIG. 29 illustrates units involved in a control plane signaling method used for changing the size of a mini cell, in accordance with the invention.

FIG. 29 shows an embodiment of the cell size change method, in the following referred-to as control plane signaling. A cell header reading device 83 identical to that shown in FIG. 15 receives the user data bit stream 84 transmitted from a symbolically shown sending device 85. When it is desired to change the mini cell size the sending device 85 sends a control message 86 which is transported on a control channel and which indicates that the connection having the CID=N shall change its cell size from length L1 to. a new length L2, wherein L is the number of octets making up the mini cell.

The control message 86 is sent in a bit stream 87 in a control channel. The bit stream 87 is not synchronized with the bit stream 84. A protocol handler for signaling messages 88 receives the control message and delivers it to the control system 80. The control system 80 will now write the new cell length L1 into the cell header reading device 83 at the address of the identified connection CID=N.

After a sufficient time has lapsed for the control system 80 of the ATM network to process the control message the sending device 85 changes the cell size from L1 to L2 by setting a flag 82 in the first mini cell 89 using the new size L2. This will signal to the receiving side that this cell and the following cells have the new size L2.

Finally, when the first mini cell 89 which carries the flag 82 is received by the cell header reading device 83 and the CID of the mini cell 89 is received by register 30 the new length L2 will be read from the mapping table associated with this CID. The second counter 50 will thus control multiplexor 60 in such manner that the new cell size will be applied to the mini cell 89 in the shift register 10 and all further cells belonging to this connection. In this manner no information will be lost when the cell size is changed.

Control plane signaling can trigger cell size changes on a second basis. This is so because the control system 80 has to process control signals which typically takes about ½-second. Accordingly control plane signaling is slow and require synchronization.

It should be noted that FIG. 29 is somewhat simplified in order to clearly teach the synchronizing method. In reality bit stream 87 is interleaved in bit stream 84 on an irregular time basis.

Method 1.—Detailed Description

Figure 30:
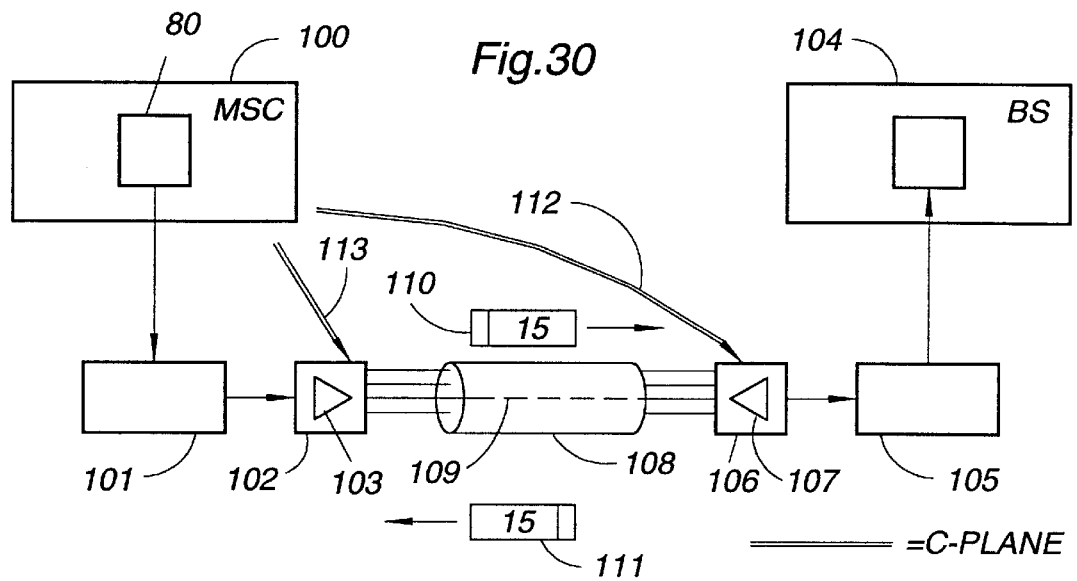
FIG. 30 illustrates in more detail the control plane signaling method described in FIG. 23.

The general method described in connection with FIG. 29 will now be described in detail with reference to a GSM system shown in FIGS. 30. In FIG. 30 a controlling node 100 is a MSC (Mobile Services Switching Center) in a GSM network. The controlling node 100 comprises a control system 80 which controls a transmission equipment 101. The transmission equipment in its turn comprises a mini cell packetizing device 102 that comprises a cell header reading device 103 of the kind shown in FIGS. 15, 17, 18 and 19. A base station 104 in the GSM network has a similar transmission equipment 105 with a cell depacketizing device 106 that comprises a cell head reading device 107. The transmission equipment 101 has a non shown mini cell depacketizing device and the transmission equipment 105 has a non-shown mini cell packetizing device. The transmission equipments 101 and 105 are exchanging packets over a link 108. Several connections may exist simultaneously but for the sake of the example only one specific connection 109 is considered. The mini cells, symbolically shown at 110 and 111, used in the packets for connection 109 are supposed to have a length of 15 octets each. Traffic is supposed to take place continuously on an on-demand basis. At some instant, depending on an external event, such as for example switching from one service to another, switching from speech service to data service or from half rate speed to full rate speed, the control system 80 initiates a change of the size of the mini cells by sending a respective control message 112, 113 to each one of the transmission equipments 101 and 105. Each control message indicates that for connection 109 shall the mini cell size shall be changed to a new size of 23 octets. Upon reception of the control message no immediate action is taken other than that each equipment now knows that the size is about to be changed to 23 octets. Not until the transmission equipment 105 has information to send it will act. The sequence of operations which then will take place will be described with reference to FIG. 31.

Figure 31:
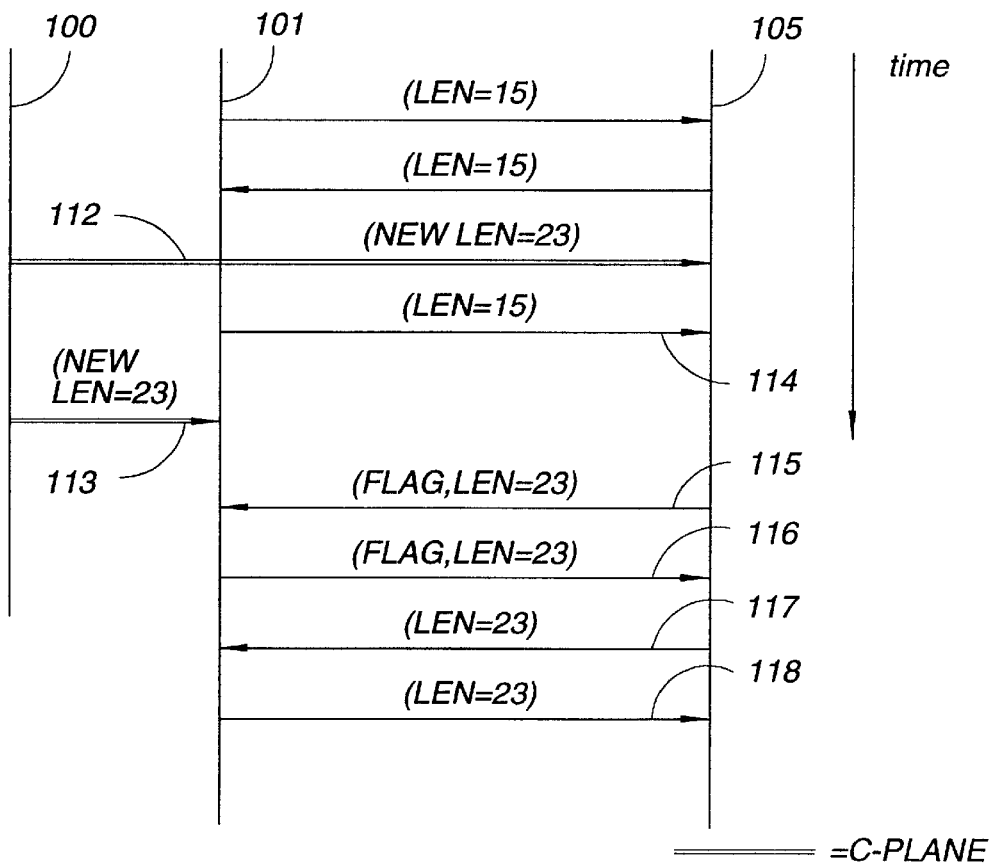
FIG. 31 is a signaling diagram for the control plane signaling method.

FIG. 31 is a signaling diagram showing packets being signaled between transmission equipments 101 and transmission equipment 105. The packets are represented by arrows and above the arrows the size of the mini cells used in the packets are shown. Following the arrows in order of time from the top to the bottom the following happens: Initially packets, represented by the two uppermost signal arrows, are exchanged between the transmission equipments 101, 105. The cell length is initially 15 octets. Next the control message 112 is sent to transmission equipment 105. It may also happen that one or more further packets 114 are sent from transmission equipment 101 to transmission equipment 105 before the control message 113 is sent to the transmission equipment 101. As indicated above the receiving transmission equipment 105 will not react on the reception of the control message 112 until it has something to send. The next time the transmission equipment 105 has information to send, it will send it in a packet 115 in which cells having the new cell length of 23 octets are used. In the first cell of the new length a first flag is set. This first flag is flag 82 in FIG. 29. The first flag indicates that this mini cell 115 and the following ones are of the new length. In the transmission equipment 101, now acting as a receiving unit, the flag is detected by the cell header reading device of the non shown depacketizing device and is used to trig a mechanism that alters the length of the mini cells to be sent in the future from this transmission equipment 101 to the new length. This mechanism is resident in the mini cell packetizing device 102. Next, when transmission equipment 101 has information to send, it will send it in packets with mini cells of the new length. In the first one, represented by signal arrow 116, of these a second flag is set. Packets which thereafter are exchanged between transmission equipments 101 and 105 will all have the new length as indicated by packets 117 and 118 and will all have no second flag set.

From the above it is obvious that the first flag in the first mini cell 115 acts as a synchronizing flag. The second flag in mini cell 116 acts as an acknowledgment flag that confirms to the transmission equipment 101 that the transmission equipment 105 has received the synchronizing flag. After exchange of the two flags connection 109 is in a synchronized state in which both transmission equipments 101 and 105 are sending and receiving packets with the new length. In this manner the length of the mini cells used for a particular connection is changed while the connection remains established.

The new length is transmitted in control messages 112, 113. A control message is typically a separate cell, such as an OAM cell. OAM mini cells are sent over a separate connection or in connection 109. The use of control messages has no influence of the bandwidth available to the connection 109. When the mini cell length is to be changed, this will cost only one binary digit, namely the flag bit, of a mini cell. In other words, only one bit needs to be used in the protocol for exchanging information between any two users in the mobile radio system. From bandwidth utilization point of view the control plane signaling method is effective.

It should be recalled that the available mini cell lengths are configured into the mobile radio system.

In accordance with a modification of the above method the first flag is sent in a mini cell that has the old length of 15 octets. This will give the transmission equipment 101 ample time to instruct its mini cell header reading device to change its settings for reception of cells with the new length.

The way the control messages 112, 113 are signaled to the sending and receiving side of the particular connection is not specified by method 1. To summarize method 1 a separate control mini cell is required in order to change the size of the mini cells of the connection and a synchronization mechanism is required in order to make the new mini cell size effective at the right instant.

Method 2.

This method is an example of method 1 and illustrates how the control message is signaled to the transmission equipments 101, 105. In this method a control mini cell is of type 2) above is used. The control mini cell is of the type shown in FIG. 24 and contains a field 94 containing the new mini cell size. The CID value of the control mini cell is different from that of connection 109 the cell size of which is to be changed. Accordingly the control message is sent on a connection which is different from that over which user data is sent.

Figures 32, 33:
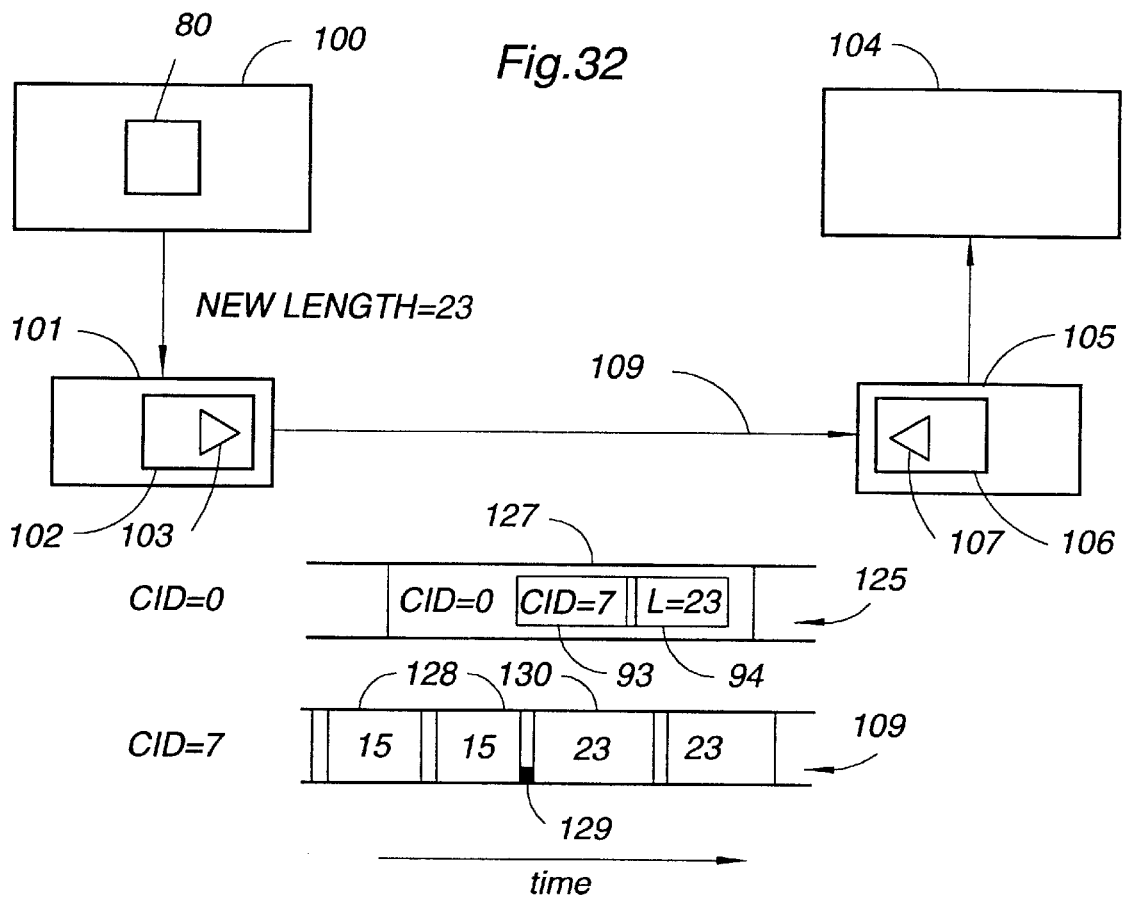
FIG. 32 is a block diagram illustrating a second method for changing the size of a mini cell.
FIG. 33 is a signaling diagram for the second method.

Refer to FIG. 32. There is a synchronization problem because the control mini cell is not linked to sequence of the mini cells the size of which is to be modified. Thus there are two mutual independent connections; one, 125, for the control mini cell and another one, 109, for the user data mini cells. For the sake of the example the control mini cell, labeled 127, has a CID value of 0 and the user data mini cell has a CID=7. Connection 109 is active sending packets, which all are filled with mini cells 128 of a length of 15 octets, to transmission equipment 105. At some instant the control system wants to change the mini cell size of the packets in the connection 109 from 15 to 23 octets. The control system orders the sending of a control mini cell 127. The control mini cell is sent in connection 125. The control mini cell has a CID=0 and contains in its payload: (a) the CID field 93 and the length field 94. CID-field 93 refers to the connection the mini cell size of which is to be changed; in this case CID=7 is indicated. In the length field 94 the new length 23 is indicated.

The sending transmission equipment 101 and the receiving transmission equipment 105 will both receive the control mini cell 127, compare the signaling diagram shown in FIG. 33, and they will both learn the new length of 23 octets. Any of the two units can now start to use the new length at the next synchronization instant. To generate a synchronization instant the receiving transmission equipment 105 sets a flag 129 in the first mini cell 130 with the new length it sends in connection 109. The flag comprises one binary digit and indicates to the receiving unit that the following mini cells, starting with the mini cell in which the flag bit is set, will all have the new length L=23. All further mini cells sent from the transmission equipment 105 will then have the new length. When the transmission equipment 101 receives mini cell 130 the cell flag will indicate that the mini cell is formatted with the new length. The transmission equipment 101 will therefore depacketize cell 130 and all following mini cells using the new length of 23 octets. When transmission equipment 101 has anything to send to the transmission equipment 105 it will use the new length as exemplified by arrow 131.

The next synchronization instant referred to above may occur when a new service is invoked by the control system or when the control system for other reasons want to change the cell size of the particular connection.

Accordingly it is possible to send the flag bit as soon as the sending unit as well as the receiving unit of the connection 109 has received the control mini cell 127. The flag bit acts as a means of synchronization for switching from the old mini cell size to the new mini cell size. The synchronization is performed by the sending and receiving units themselves with no help from the control system. The transmission equipment first to send sets the synchronization flag when it changes the length of the mini cells it transmits. The receiving unit, upon reception of the flag, starts to use the new length format.

In the illustrated example the transmission equipment first to send after reception of the control cell 127 is equipment 105. It could as well be transmission equipment 101.

This method operates quicker than method 1 since the control mini cell contains the new size and therefore the transmission equipment 101, 105 need not await to be contacted by the control system in order to have the new cell size. Method 2 has an attractive bandwidth utilization since the overhead in the payload is only one bit each time the size is changed.

OAM mini cells are handled by the operation and maintenance system of the communication system. In accordance with a modification of method 2 the OAM mini cells indicating a size change of connection 109 are handled by the terminating transmission equipment 105.

Figure 34:
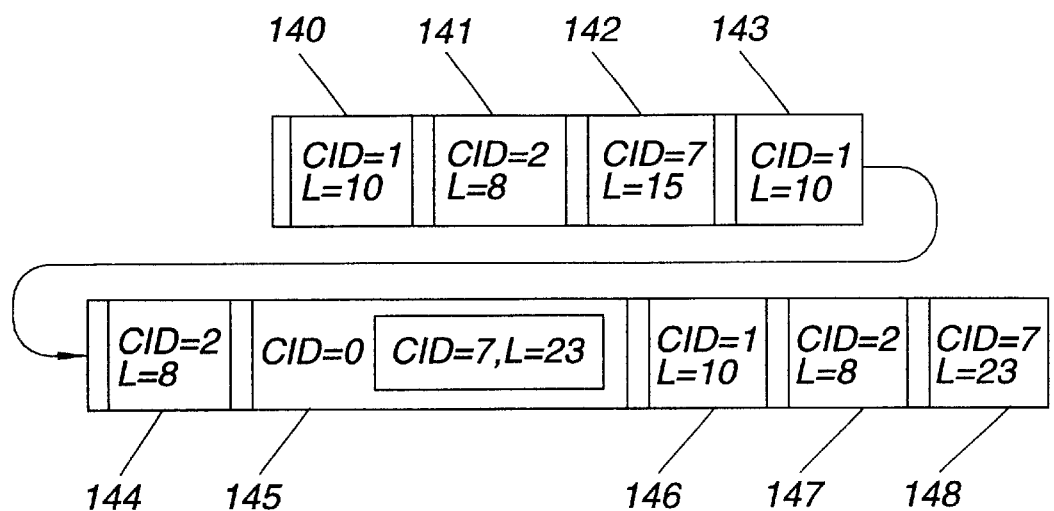
FIG. 34 is a sequence of incoming mini cells to a mini cell packetizing device, said Figure illustrating a variant of the second method.
Figure 35:
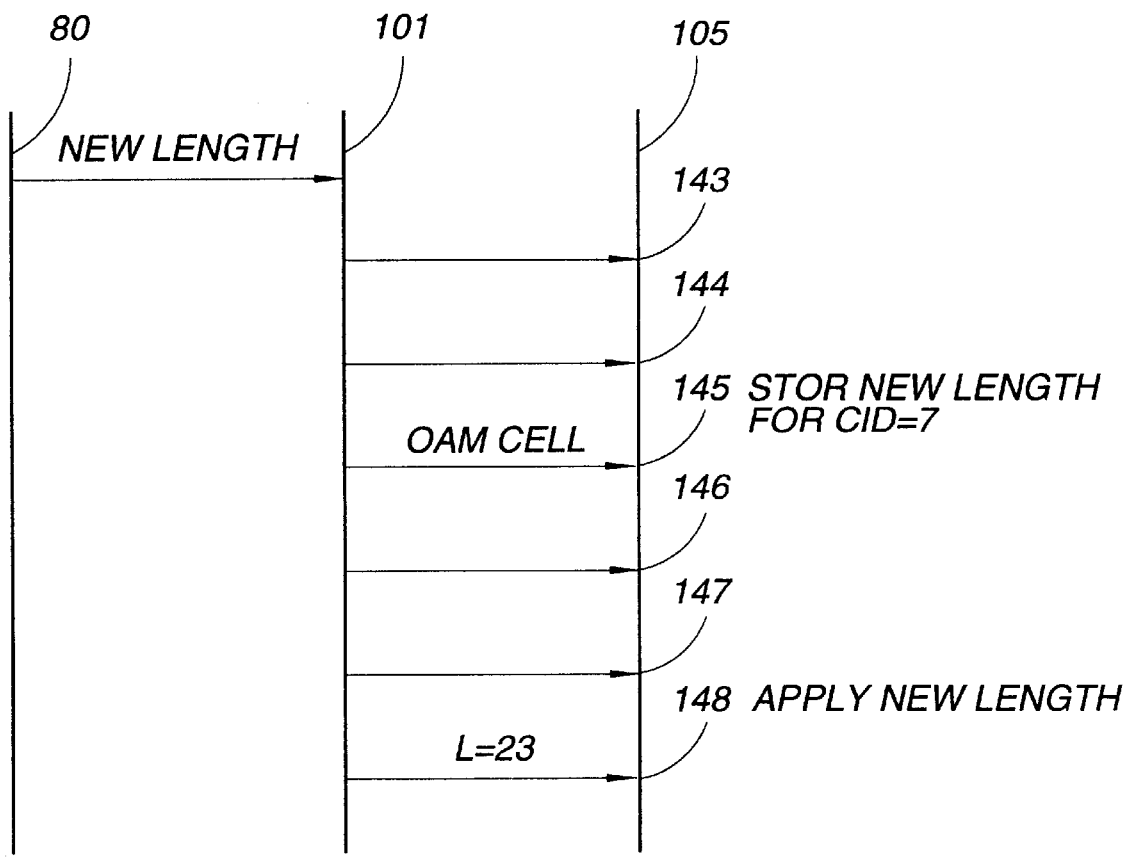
FIG. 35 is a signaling diagram related to FIG. 34.

Refer to FIGS. 34 and 35. The control mini cell is of the type shown in FIG. 24. There is a problem linked to cell size change since many other things happen in the system before the cell size of connection 109 is changed. FIG. 34 illustrates a sequence of packets which belong to three different connections having the respective ID:s of CID=1, CID=2 and CID=7. All of the three connections are sending information. Right in the middle of the packet sequence it is desired to change the cell size in the connection the CID value of which is CID=7 and which uses a cell size of 15 octets.

First in the packet sequence comes a packet 140 belonging to the connection that has CID=1 and a length L=10. Next comes a packet 141 that belongs to the connection that has CID=2 and a length L=8. Then comes a packet 142 that belongs to the connection that has CID=7 and L=15 octets. Next comes a packet 143 belonging to CID=1, next a packet 144 belonging to CID=2.

For some reason the control system 80 has decided to change the size of the cells in the connection that has a CID=7 from current L=15 to L=23. The control system 80 therefore inserts a control mini cell 145 into the outgoing data stream. A CID value of CID=0 signifies an OAM mini cell. In the payload of the control mini cell 145 there is a reference to the connection CID=7, the connection the cell size of which shall be changed, and an indication of the new cell length L=23. When the control mini cell is received by the transmission equipment 105 at the receiving side the-depacketizing device 106 stores the information given in the control mini cell 145, i.e. it stores the following: in the connection which has CID=7 the cell size shall be changed to 23 octets. The information is stored until the next time a mini cell arrives on this connection. During this time, i.e. during the time from the reception of mini cell 145 and the arrival of the next mini cell which has a CID=7, many other mini cells belonging to the other two connections arrive to the packetizing device 106. This is illustrated by mini cells 146 and 147 belonging to connections CID=1 and CID=2 respectively. When the next cell in connection CID=7 finally arrives, i.e. when mini cell 148 arrives, then the transmission equipment 105 reads it and its cell depacketizing device formats it into segments that all are 23 octets long. All of the above method steps are shown in FIG. 35.

The transmission equipment 105 is simple provided the control system 80 allows for cell modification of one connection at a time. If several connections shall change cells size simultaneously the implementation of the transmission equipment 105 will be more complex.

Method 3.

From system point of view mini cell size change in accordance with method 3 is handled by the operation and maintenance system and the control message for size change is transported in the traffic flow, that is the flow in which user data mini cells are transported.

In method 3 the control mini cell is of type 3) above. The control mini cell is an OAM mini cell having an EXQ-value of 2 (binary 11). The OAM cell, shown in FIG. 25, has a CID-value equal to that of the connection the cell size of which is to be changed. In other words the OAM cell is transported in the same connection the cell size of which is to be changed. This will ensure that the control mini cell is in the right place in the mini cell flow of the connection the size of which shall be changed. With right place is meant that the control mini cell lies between two mini cells of different sizes which both belong to the connection the mini cell size of which shall be changed. In principle no synchronization mechanism will therefore be required. However, since an OAM mini cell is not terminated in the same manner as a traffic mini cell synchronization problems may arise. The payload type selector PTS=OAM of the control mini cell indicates that the mini cell is an OAM cell. The transmission equipment handle user data mini cells at the traffic plane and they do not handle OAM mini cells. OAM mini cells are handled by the operation and maintenance system at the control plane.

Similar hardware devices as described in FIGS. 30 and 32 are used in method 3 and will therefor not be described again. Following the examples of FIGS. 30 and 32 it is also supposed that connection 109 shall change size of its mini cells. Connection 109 has a CID=7. The mini cell size of this connection 109 shall be altered from 15 octets to 23 octets. Now, refer to FIG. 36. On this connection an OAM control mini cell 134 is inserted. The OAM control mini cell comprises the new length of 23 octets in its length field 94A (FIG. 25).

Figure 36:
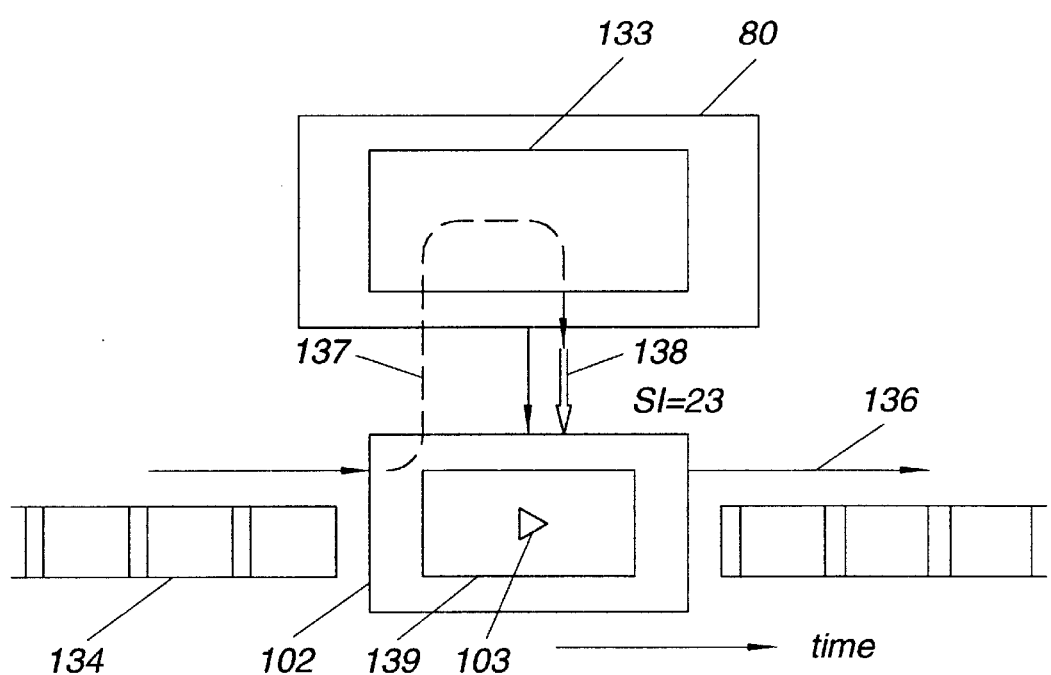
FIG. 36 is a block diagram illustrating delay caused by interpretation of an cell size change order by the control system.

The control system 80 shown in FIG. 36 comprises an OAM mini cell handler 133 and operates on the cell packetizing device 102 with the cell header reading device 103.

Incoming packets to the cell packetizing device 102 arrive from the left in FIG. 36 and outgoing packets leave to the right. As long as incoming mini cells have an EXQ value different from 2 (binary 11) the non shown cell packetizing unit of transmission equipment 105 will packetize them in packets which are sent to their destination along arrow 136.

The transmission equipment 105 that terminates connection 109 will identify the control mini cell as an OAM mini cell since its PTS=OAM. The transmission equipment 105 will lift the OAM control mini cell out of the data stream and send it, as indicated by arrow 137, to the control system 80 in which it is treated by the OAM cell handler 133. Logic residing in the OAM mini cell handler will interpret the OAM mini cell. The logic will in-this case find that the OAM cell refers to CID=7 and that a change of mini cell length shall take place. In response the interpretation the OAM handler returns to the cell packetizing unit a size indication message SI indicating the mini cells on connection 109 shall have a new length SI=23. This message is illustrated by arrow 138. Upon receipt of this message the packetizing device 102 starts reading the incoming mini cells applying the new length L=23. To do so the packetizing device 102 orders a new length setting of the its RAM memory 70.

OAM cells may be of many kinds. An OAM cell contains a message that indicates to the OAM handler 133 what kind of action to be taken by the control system in response to a received OAM cell. For example it can be a message ordering the control system 80 to measure the error bit rate. Another OAM cell may contain a message reporting a hardware malfunction to the control system 80. Still another OAM mini cell message is to order the control to test a multitude of mini cells in some respect, for example with regard to a check sum. The packetizing device 102 will send all mini cells having PTS=OAM to the OAM handler in the control system 80 Although the OAM mini cell 134 is linked to the instant of cell size change and although it belongs to the connection 109 the mini cell size of which is to be changed it appears as if no synchronization is required. This is however not always true. The system design may also affect the behavior of method 3. Therefore it might be necessary to provide some synchronization mechanism. Why this is so will be described next.

It takes the control system 80 some time to interpret the OAM mini cell 134. Also the return transmission of SI to the packetizing device 102 takes time. During this time a new cell may have arrived in the connection 109. During this time the cell depacketizing unit will not know which mini cell size to apply on the incoming mini cells. This is why some synchronization mechanism is needed.

In accordance with a modification of method 3 it is therefore suggested that the transmission equipment 105 that terminates the connection 109 itself reads the OAM mini cell in order to learn its type. If the OAM mini cell is a cell size modification mini cell the receiving transmission equipment itself will handle the OAM cell and will start to receive and to send mini cells with the new length. This will eliminate the time delay referred to above in connection with interpretation and SI return transmission interval. Still method 3 will ensure that the instant at which the mini cell size is changed will be in correct sequence. In this manner the transmission equipment will ensure that the mini cell size modification cell will be linked to the first mini cell that has the new cell size According to this modification of method 3 the OAM cell is handled at the traffic plane.

From bandwidth utility point of view method 3 has no loss of bandwidth provided that the frequency at which the mini cell size is changed is moderate.

Method 4.

In accordance with this method the control mini cell is transported in the traffic flow and is handled autonomously by the packetizing and depacketizing devices 102, 106. The control mini cell is terminated in the traffic plane. The loop 137 shown in FIG. 36 is eliminated.

Figures 37, 38:
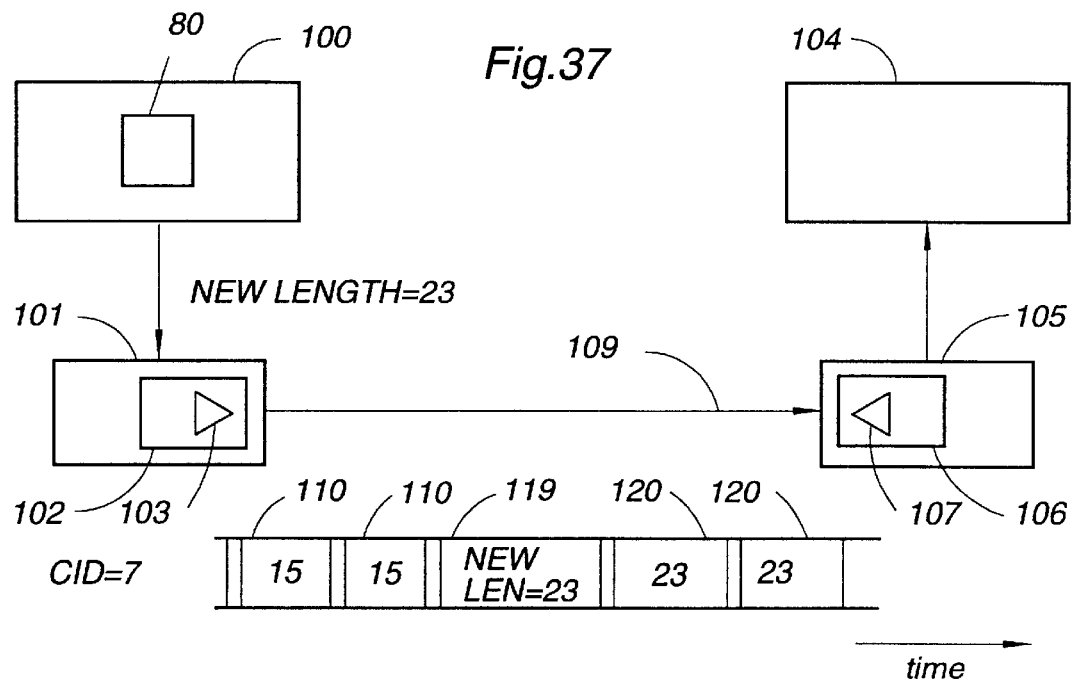
FIG. 37 is block diagram illustrating a fourth method for changing the size of a mini cell.
FIG. 38 is a signaling diagram for the fourth method.

In method 4 the control mini cell is of type 1) above the cell is of the type shown in FIG. 26-wherein the CID value of the control cell is the same as that of the connection. The method will be described with reference to FIGS. 37 and 38. In FIG. 37 all units are the same as those described in connection with FIGS. 30 and 32. Suppose transmission equipment 101 is sending packets to transmission equipment 105 and that the packets are filled with mini cells 110 having the length of 15 octets.

At a certain instant the control system 80 orders a change of the length of the cells. The new length shall be 23 octets. A cell size change order is sent to the transmission equipment 101, for example in an OAM cell. The transmission equipment 101 responds to this order by sending a control mini cell 119 of the type shown in FIG. 26 to transmission equipment 105. All of the control mini cell 119 is used for carrying cell size change information. The receiving transmission equipment 105 must therefore change the packet size to 23 octets. The question is when.

Provided the transmission equipment 101 sends the control cell 119 after the last one of the cells 110 of length 15 octets, then all further cells which are sent from the transmission equipment 101 may all have the new length of 23 octets. No additional synchronization will be needed.

This is so, because in an ATM network ATM cells are guaranteed to arrive to their destination in the correct order of time. In other words the order of time in which the ATM cells are sent will not be reversed at the receiving side. So therefore the control system 80 may at any time order the sending transmission equipment 101 to change to the new mini cell size.

A signaling diagram shown in FIG. 38 illustrates the method. FIG. 38 is similar to FIG. 31 and will therefore not be described in detail. In FIG. 38 the order to change mini cell size is indicated by arrow 121. The control mini cell is indicated by arrow 122 and has a length of 15 octets. It cannot have the new length. The next mini cell 123 sent by the transmission equipment 101 and all mini cells following this are sent with the new size. Upon receipt of the control mini cell 122 at the transmission equipment 105 a mechanism, resident in the packetizing device 107 and the non-shown depacketizing device, will set the length of the mini cells that follow mini cell 122 to the new length of 23 octets. So when mini cell 123 as sent from the transmission equipment 101 arrives to the transmission equipment 105 it will be decoded with the new length. Similarly, when transmission equipment 105 sends its next mini cell 124, it will send it with the new length.

The bandwidth loss adhering method 4 is proportional to the how often, i.e. the rate or frequency by which, the cell size is modified. It is only in connection with mini cell size change that overhead appears in the form of a control mini cell. Mini cells 110 and 120 contain no fields for cell size indication. Therefore they have no overhead relating to cell size indication. This is in contrast to the mini cells described in connection with FIGS. 4, 6, 9, 11, 12 which all contain a mini cell size indication.

Method 4 will result in a complex implementation of the transmission equipment 101, 105 since they must be able to handle a great number of connections simultaneously and in a very short time.

It should be remembered that ATM is a connection oriented technique that defines point-to-point connections. This is in contrast to a packet switched network which is of a connection-less nature. In a packet switched network packets that have the same destination can take different routes through the network and may therefore arrive in reversed time order.

Method 5.

Method 5 is an improvement of method 4. Instead of using a complete mini cell for changing the size of the mini cells of an ongoing connection an optional field is inserted into a mini cell carrying user data. When the optional field is present it indicates the new size to be used for the mini cells of the connection. In method 5 the information to change size of the mini cells are transported in the traffic flow. According to method 5 a somewhat different message format is used. In principle an explicit, that is separate, length field is used. The method will be described with reference to FIGS. 39–41.

Figure 27:
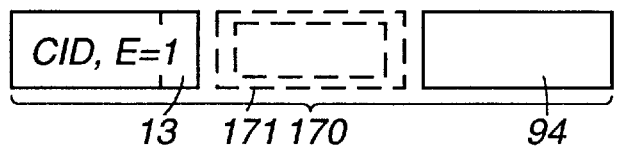
FIG. 27 shows a combined user data and control mini cell provided with an extension bit in its header and an optional extension field in its payload, said optional extension field containing the new cell size to be used for the mini cells in the connetion.

In method 5 a cell size modification mini cell 170 of the type shown in FIG. 27 is used. An optional field 171 is used to indicate the new length to be used for the mini cells following this cell 170 and belonging to the same connection. The connection is indicated by the CID in the header of the mini cell. In the header there is also an extension bit 13 (FIG. 27) which when set indicates that the cell contains the optional length field 171. If the extension bit is set to 0 no field 171 is present in the cell 170.

Figure 39:
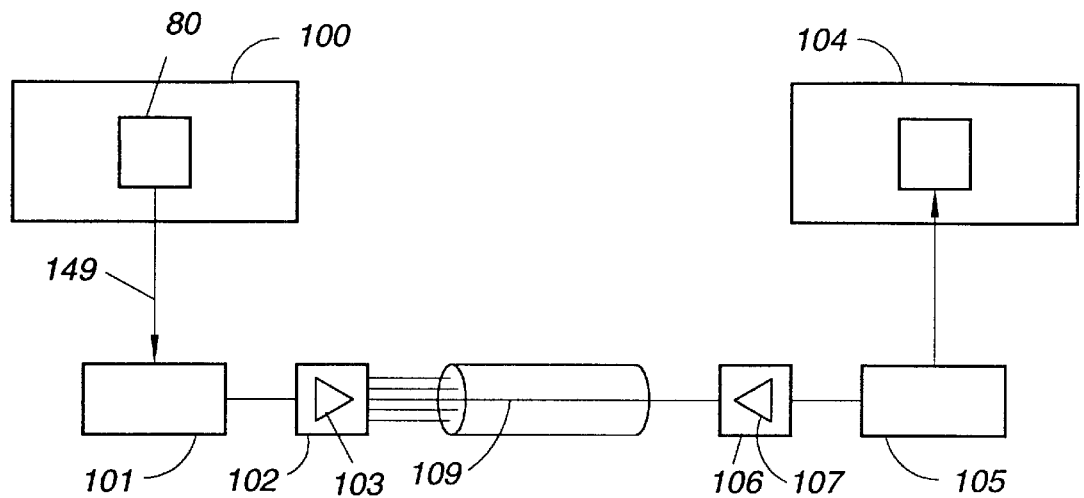
FIG. 39 is a block diagram illustrating a fifth method of changing the size of mini cells.
Figure 40:
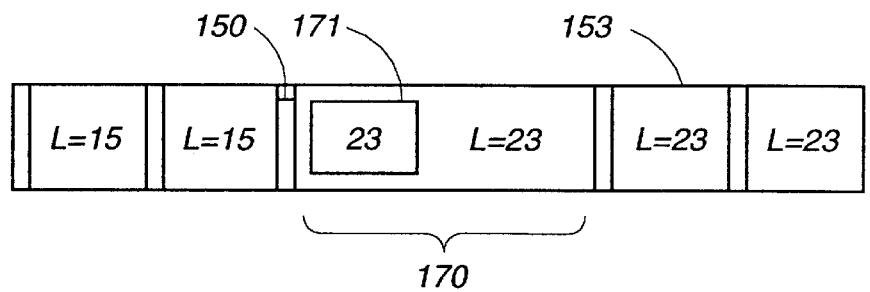
FIG. 40 is an user data mini cell provided with an optional field for indicating that th e mini cell size shall be changed to the new size indicated in the optional field

Method 5 will be described in connection with FIGS. 39–41. FIG. 39 is similar to FIGS. 30 and the same devices are shown. When the cell size shall be changed the control system 80 will send a cell size modification order 149 to the sending transmission equipment 101 only.

Upon receipt of the order to change mini cell size the sending transmission equipment 101 sets flag 150, adds the optional length field 171 to the mini cell 170, states the new cell size in the added length field, 23 in the example, sends the mini cell in the new length format of 23 octets and continues to send all further mini cells with the new length. Upon reception of the control mini cell 170 transmission equipment 105 detects the flag. In response to the detection of the flag the transmission equipment 105 changes the mini cell size from the current size to the new size indicated in the added optional length field 171. The receiving transmission equipment 105 starts to use the new size of 23 octets, beginning with the control cell and continuing with all of the following cells on this connection.

Figure 41:
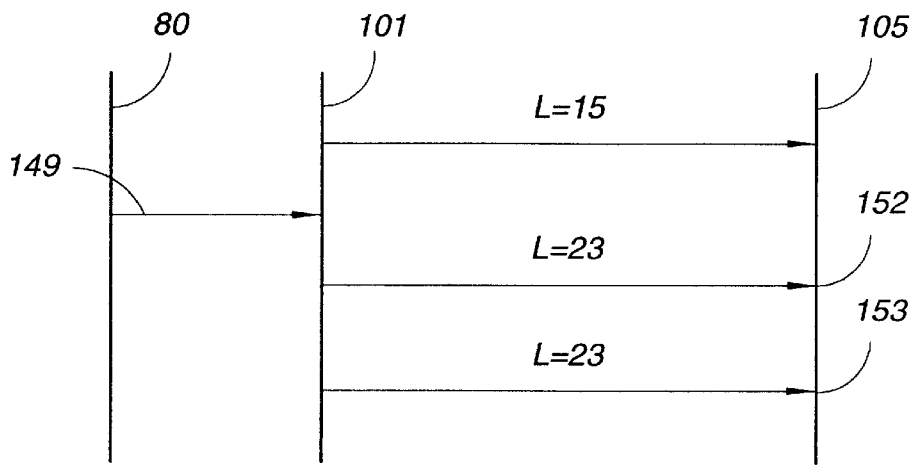
FIG. 41 is a signaling diagram relating to the fifth method and FIG. 42 is a block diagram of mobile telephone system provided with the cell header analyzing units.

In FIG. 41 a self explanatory graphic illustration of method 5 is shown.

Method 5 will save bandwidth since the length field is not present all the time, as is the case with method 4, but is present only when cell size modification is to take place.

A modification of method 5 is to use the new length format beginning with the mini cell following the mini cell that contains the optional length field 171. In this case the old length format is applied to the mini cell that contains the optional length field.

Comparison of Methods 2–5.

Table 1 below is a comparison of some of the characteristic features of methods 2–4. All figures given in the table are estimated.

TABLE 1

| Method No. # | Change rate in relation to packet rate | Implementation complexity | Robustness in relation to the explicit length indication method |
|---|---|---|---|
| 2 | <1/100 | factor 1 | 0.1 |
| 3 | 1/20 | factor 3 | 0.2 |
| 4 | 1/10 | factor 7 | 0.2 |
| 5 | 1 | factor 8 | 0.1 |

Methods 2 and 3 are more robust compared to methods 4 and 5 in that they require synchronization. If the control mini cell for some reason is lost, no synchronization will be achieved and no length modification will take place. Information will be transmitted and received with the old cell length and no information will be lost. Synchronization is achieved by sending two mini cells, one in each direction of the connection, comprising synchronizing information. The robustness will be increased but the change rate will be reduced by a factor of 2. In methods 4 and 5 no synchronization is required. If the control cell is lost it will not be received at the receiving side. The transmitting side will change to the new cell size and will start to send the information in cells of the new length. The receiving side will continue to receive cells which it thinks still have the old size. The received information will therefore be corrupted.

With method 5 it is in principle possible to change the mini cell length of each one of the successive mini cell (each mini cell has a new length; change rate=cell rate) of an individual connection. If this happens method 5 degenerates and becomes the same method as the explicit length method with the addition of a flag 150.

If the size is changed from mini cell to mini cell using method 5, then method 5 is slightly inferior to the explicit length method. If, however, the change rate is each second cell, then method 5 is better than the explicate length method. If the change rate is one per each hundred cells, then method 5 is superior to the explicit length method. Method 5 is preferred when the change rate is in the order of one length modification at each ten cells.

Figure 28:
FIG. 28 shows a combined user data and control mini cell similar to that of FIG. 27

Instead of using an extension bit 13 it is also possible to use a specific payload type selector code, PTS-code, similar to extension code method described in connection with FIG. 28 to indicate that the mini cell is used for size change of the following mini cells in the same connection. This is shown in FIG. 28. In stead of using a separate extension bit 13 in the mini cell header in order to indicate that the mini cell is a user data cell that also comprises information indicating that the mini cell size shall be changed, a code point in the payload type selector PTS is used for this purpose. In particular PTS has a particular code PTSI indicating this.

Figure 42:
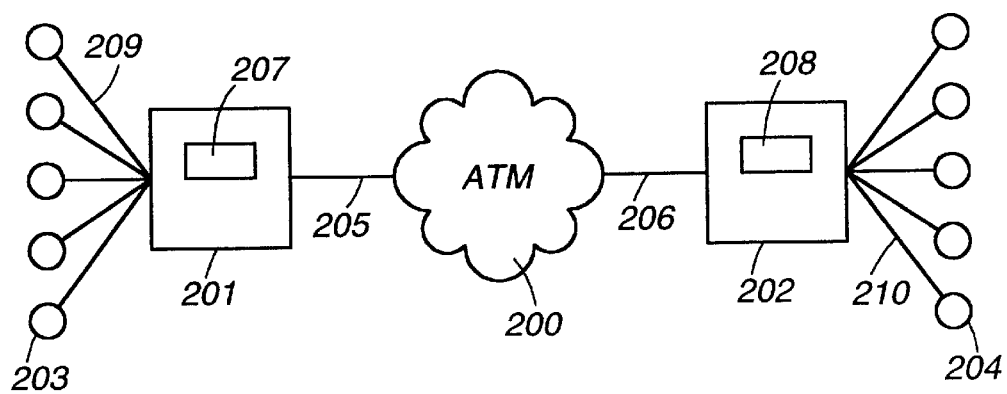

In FIG. 42 there is shown a mobile telephone system comprising an ATM network 200 with a sending unit 201 and a receiving unit 202 are connected via respective link 205 and 206. User data sources 203 are connected to the sending unit over a respective connection as shown symbolically by the lines 209. User data sinks 204 are connected to the receiving unit 202 over a respective connection 210. Connections 209, formed by mini cells, are multiplexed together in the sending unit 201 with a non shown multiplexor. Likewise there is a non shown demultiplexor in the receiving unit 202 that demultiplexes mini cells belonging to connections which are terminated by the user data sinks 204. In the sending unit 201 there is a mini cell header reading device 207 of the kind shown in FIG. 12 and in the receiving unit there is a similar mini cell header reading device 208 of the kind shown in FIG. 12.

In FIG. 38 there is shown a mobile telephone system comprising an ATM network 200 with a sending unit 201 and a receiving unit 202 are connected via respective link 205 and 206. User data sources 203 are connected to the sending unit over a respective connection as shown symbolically by the lines 209. User data sinks 204 are connected to the receiving unit 202 over a respective connection 210. Connections 209, formed by mini cells, are multiplexed together in the sending unit 201 with a non shown multiplexor. Likewise there is a non shown demultiplexor in the receiving unit 202 that demultiplexes mini cells belonging to connections which are terminated by the user data sinks 204. In the sending unit 201 there is a mini cell header reading device 207 of the kind shown in FIG. 11 and in the receiving unit there is a similar mini cell header reading device 208 of the kind shown in FIG. 11.

What is claimed is:

1. A method for indicating the size of mini cells pertaining to an individual connection comprising the steps of:

indicating the size of mini cells, wherein the size is indicated only at instants where the size of the mini cells is dynamically changing from a first size to a second size during an established connection, wherein information signaling that the size of mini cells used for an individual connection shall be changed is sent in a control mini cell; and sending the mini cells of the connection with the second size after sending said control mini cell.

2. A method in accordance with claim 1 for dynamically changing the size of a mini cell from a first size to a second size during an established connection, wherein the control mini cell is sent in a channel different from the channel in which mini cells containing user data of said individual connection are sent.

3. A method in accordance with claim 1 for dynamically changing the size of a mini cell from a first size to a second size during an established connection, wherein said change of mini cell size is effected following a synchronizing procedure.

4. A method in accordance with claim 3 for dynamically changing the size of a mini cell from a first size to a second size during an established connection, wherein said synchronization procedure comprises the steps of: sending, upon receipt of said control mini cell, a next mini cell in accordance with said second size and with a flag set in the header of said next mini cell, and sending, upon receipt of said next mini cell, another next mini cell, and all of the following mini cells according to said second size.

5. A method in accordance with claim 4 for dynamically changing the size of a mini cell from a first size to a second size during an established connection, wherein said control mini cell is sent to a transmission equipment situated at the originating side of said individual connection as well as to a transmission equipment situated at the terminating side of said individual connection.

6. A method in accordance with claim 4 for dynamically changing the size of a mini cell from a first size to a second size during an established connection, wherein said control mini cell is an operation and maintenance control mini cell containing a field wherein: (a) the identity of said individual connection is indicated and (b) the second size is indicated.

7. A method in accordance with claim 5 for dynamically changing the size of a mini cell from a first size to a second size during an established connection, wherein said control mini cell is an operation and maintenance control mini cell which when received at said terminating transmission equipment is sent to a control system for interpretation, said control system, upon receipt of said operation and maintenance cell and interpretation thereof as a mini cell that signals the change of size of mini cells pertaining to said connection, sends the second size to said terminating transmission equipment, said terminating transmission equipment, upon receipt of said second size applying said second size on all further received mini cells pertaining to said connection.

8. A method in accordance with claim 6 for dynamically changing the size of a mini cell from a first size to a second size during an established connection, wherein said operation and maintenance control mini cell which when received at said terminating transmission equipment is interpreted thereof as a mini cell that signals the change of size of mini cells pertaining to said connection, said terminating transmission equipment in response to said interpretation, from which it learns said second size, applying said second size on all further received mini cells pertaining to said connection.

9. A method in accordance with claim 1 for dynamically changing the size of a mini cell from a first size to a second size during an established connection, wherein the control mini cell is sent in the same channel in which mini cells pertaining to said individual connection are sent.

10. A method in accordance with claim 9 for dynamically changing the size of a mini cell from a first size to a second size during an established connection, wherein originating transmission equipment first sends said control mini cell and thereafter sends all further mini cells belonging to said individual connection with said second size.

11. A method in accordance with claim 1 for dynamically changing the size of a mini cell from a first size to a second size during an established connection, wherein said control mini cell includes a header indicating that said control cell comprises said second size in its payload.

12. A method in accordance with claim 11 for dynamically changing the size of a mini cell from a first size to a second size during an established connection, wherein transmission equipment at the terminating end of said individual connection, upon receipt of said control mini cell, starts to read all further mini cells pertaining to said individual connection with said second size.

13. A method in accordance with claim 10 for dynamically changing the size of a mini cell from a first size to a second size during an established connection, wherein said control mini cell is a user data mini cell which comprises an extension bit in its header which Indicates that said user data mini cell comprises an optional field indicating said second size.

14. A method for indicating the size of mini cells pertaining to an individual connection comprising the steps of:

indicating the size of mini cells, wherein the size is indicated only at instants where the size of the mini cells is dynamically changing from a first size to a second size during an established connection, wherein a control message indicating mini cell size modification is sent followed by a synchronization signal; and sending the mini cells of the connection with the second size after sending said control message.

15. A method of changing the size of a mini cell from a first size to a second size during an established connection in accordance with claim 15, wherein mini cells belonging to the same connection are transported in a user data channel, wherein the control message comprises the second size and the identity of the connection, the control message is sent from a base station to a control system over a control channel using an access protocol, that said control system associates said second cell size with mini cells belonging to said connection, that a cell length modifying indicator, used as said synchronization signal, is set in the first mini cell having the new, second size, that said control system upon detection of the cell length modifying indicator in said first mini cell changes the size of the mini cells belonging to said connection from said first to said second size.

16. A method of changing the size of a mini cell from a first size to a second size during an established connection, wherein an operation and maintenance connection is common to all connections and has a predefined first connection identity, comprising the steps of:

carrying said operation and maintenance connection by operation and maintenance cells including said predefined first connection identity, wherein an operation and maintenance cell includes an identification of the connection, the bandwidth of which is to be changed, and information on said second size; and changing the size of the mini cell for the connection from said first size to said second size based on the information of said second size included in said operation and maintenance cell.

17. A method of changing the size of a mini cell from a first size to a second size during an established connection, wherein a resource management connection is common to all connections and has a predefined first connection identity, comprising the steps of:

carrying said resource management connection by resource management cells including said predefined first connection identity, wherein a resource management cell includes an identification of the connection, the bandwidth of which is to be changed, and information regarding said second size; and changing the size of the mini cell for the connection from said first size to said second size based on the information of said second size included in said resource management cell.

18. In a communication system an apparatus for transmitting mini cells comprising:

means for transmitting mini cells of a first size over a connection to another apparatus in the communication system; and means for transmitting mini cells of a second size to the another apparatus, wherein an indication of a size of the mini cells of the second size is only transmitted when the mini cells change from the first size to the second size and wherein said indication of the size of the mini cells of the second size is transmitted in a control mini cell wherein said control mini cell contains a non-linear coded field for identifying the second size of the mini cells and wherein said non-inear coded field further contains a bit which indicates that a length of the non-linear coded field is an extended length.

19. In a communication system an apparatus for transmitting mini cells comprising:

means for transmitting mini cells of a first size over a connection to another apparatus in the communication system; and means for transmitting mini cells of a second size to the another apparatus, wherein an indication of a size of the mini cells of the second size is only transmitted when the mini cells change from the first size to the second size and wherein said indication of the size of the mini cells of the second size is transmitted in a control mini cell wherein said control mini cell contains a non-linear coded field for identifying the second size of the mini cells and wherein a predetermined combination of bits in the non-linear coded field indicates that a length of the non-linear coded field is an extended length.

\* \* \* \* \*